US011451702B2

(12) United States Patent
Kunitomo et al.

(10) Patent No.: US 11,451,702 B2
(45) Date of Patent: Sep. 20, 2022

(54) IMAGE CAPTURING SYSTEM AND DRIVING METHOD FOR REDUCING NOISE IN A CAPTURED IMAGE

(71) Applicant: SONY CORPORATION, Tokyo (JP)

(72) Inventors: Keiji Kunitomo, Tokyo (JP); Jun Aoyama, Tokyo (JP); Shohei Kosugi, Tokyo (JP); Shun Kikuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/055,634

(22) PCT Filed: May 16, 2019

(86) PCT No.: PCT/JP2019/019448
§ 371 (c)(1),
(2) Date: Nov. 16, 2020

(87) PCT Pub. No.: WO2019/221220
PCT Pub. Date: Nov. 21, 2019

(65) Prior Publication Data
US 2021/0211570 A1 Jul. 8, 2021

(30) Foreign Application Priority Data
May 16, 2018 (JP) .............................. JP2018-094518

(51) Int. Cl.
H04N 5/232 (2006.01)
G02B 7/09 (2021.01)
(Continued)

(52) U.S. Cl.
CPC ........... H04N 5/23209 (2013.01); G02B 7/09 (2013.01); G02B 27/646 (2013.01); G03B 5/00 (2013.01);
(Continued)

(58) Field of Classification Search
CPC ............ H04N 5/23209; H04N 5/2254; H04N 5/23245; H04N 5/23241; H04N 5/2328;
(Continued)

(56) References Cited

U.S. PATENT DOCUMENTS

2009/0167878 A1* 7/2009 Kawazoe ......... H04N 5/232123
348/208.5
2011/0091194 A1* 4/2011 Isaka .................. H04N 5/23209
396/133
(Continued)

FOREIGN PATENT DOCUMENTS

CN 102262337 A 11/2011
CN 102340629 A 2/2012
(Continued)

OTHER PUBLICATIONS

International Search Report and Written Opinion of PCT Application No. PCT/JP2019/019448, dated Aug. 6, 2019, 08 pages of ISRWO.

(Continued)

Primary Examiner — Gevell V Selby
(74) Attorney, Agent, or Firm — Chip Law Group

(57) ABSTRACT

The present technique relates to a lens apparatus, a driving method, an image capturing apparatus, and an image capturing system that allow reduction of possible noise in a captured image caused by a magnetic field generated when an actuator of the lens apparatus is driven, without any change in image capturing processing of the image capturing apparatus. A lens apparatus is enabled to be mounted on an image capturing apparatus and includes an actuator, a communication section configured to receive, from the image capturing apparatus, drive frequency information used to set a drive frequency for the actuator, a control section configured to set the drive frequency for the actuator on the basis of the drive frequency information, and a driving section
(Continued)

configured to drive the actuator at the drive frequency set. The present technique can be applied to, for example, a lens apparatus mounted on a single-lens reflex camera.

19 Claims, 15 Drawing Sheets

(51) Int. Cl.
*G02B 27/64* (2006.01)
*G03B 5/00* (2021.01)
*G03B 13/36* (2021.01)
*H04N 5/225* (2006.01)

(52) U.S. Cl.
CPC ........... *G03B 13/36* (2013.01); *H04N 5/2254* (2013.01); *H04N 5/23245* (2013.01); *G03B 2205/0007* (2013.01); *G03B 2205/0046* (2013.01); *G03B 2205/0069* (2013.01)

(58) Field of Classification Search
CPC .... H04N 5/23296; H04N 9/045; H04N 5/232; G02B 7/09; G02B 27/646; G02B 7/08; G03B 5/00; G03B 13/36; G03B 2205/0007; G03B 2205/0046; G03B 2205/0069; G03B 17/14
See application file for complete search history.

(56) References Cited

U.S. PATENT DOCUMENTS

2018/0255223 A1* 9/2018 Ichihara ............. H04N 5/23245
2020/0319527 A1* 10/2020 Asano ...................... G03B 9/06

FOREIGN PATENT DOCUMENTS

| JP | 2007-006305 A | 1/2007 |
| JP | 2007-251656 A | 9/2007 |
| JP | 2015-108674 A | 6/2015 |

OTHER PUBLICATIONS

Office Action for CN Patent Application No. 201980031274.8, dated May 31, 2022, 22 pages of English Translation and 13 pages of Office Action.

* cited by examiner

IMAGE CAPTURING SYSTEM AND DRIVING METHOD FOR REDUCING NOISE IN A CAPTURED IMAGE

CROSS REFERENCE TO RELATED APPLICATIONS

This application is a U.S. National Phase of International Patent Application No. PCT/JP2019/019448 filed on May 16, 2019, which claims priority benefit of Japanese Patent Application No. JP 2018-094518 filed in the Japan Patent Office on May 16, 2018. Each of the above-referenced applications is hereby incorporated herein by reference in its entirety.

TECHNICAL FIELD

The present technique relates to a lens apparatus, a driving method, an image capturing apparatus, and an image capturing system.

BACKGROUND ART

In a case where a predetermined relation is satisfied by the period of reading out pixel signals by an image capturing element of an image capturing apparatus and the period of PWM-driving an actuator of a lens apparatus mounted on the image capturing apparatus, a magnetic field generated when the actuator is driven causes striped noise (hereinafter referred to as motor noise) in a captured image.

In this regard, in the related art, a proposal has been made to prohibit continuous scan during contrast AF (Auto Focus) in a case where a digital camera determines that an image capturing lens unit causes motor noise, on the basis of lens data corresponding to a lens ID acquired from the image capturing lens. In other words, a proposal has been made to prohibit simultaneous and parallel operation of image capturing processing and lens drive processing during contrast AF in a case where the image capturing lens unit is determined to cause motor noise (for example, see PTL 1).

CITATION LIST

Patent Literature

[PTL 1]
Japanese Patent Laid-Open No. 2007-251656

SUMMARY

Technical Problem

However, the prohibition of the continuous scan is, for example, expected to cause performance degradation such as an extended processing time for contrast AF.

The present technique has been developed in view of these circumstances, and an object thereof is to allow reduction of possible noise in a captured image caused by a magnetic field generated when the actuator of the lens apparatus is driven, without any change in image capturing processing of the image capturing apparatus.

Solution to Problem

A lens apparatus according to a first aspect of the present technique is enabled to be mounted on an image capturing apparatus and includes an actuator, a communication section configured to receive, from the image capturing apparatus, drive frequency information used to set a drive frequency for the actuator, a control section configured to set the drive frequency for the actuator on the basis of the drive frequency information, and a driving section configured to drive the actuator at the drive frequency set.

A driving method according to the first aspect of the present technique includes, by a lens apparatus including an actuator and enabled to be mounted on an image capturing apparatus, receiving, from the image capturing apparatus, drive frequency information used to set a drive frequency for the actuator, setting the drive frequency for the actuator on the basis of the drive frequency information, and driving the actuator at the drive frequency set.

In an image capturing apparatus according to a second aspect of the present technique, a lens apparatus is enabled to be mounted, and the image capturing apparatus includes an information generation section configured to generate drive frequency information used to set a drive frequency for an actuator included in the lens apparatus and a communication section configured to transmit the drive frequency information to the lens apparatus.

In the first aspect of the present technique, the drive frequency information used to set the drive frequency for the actuator is received from the image capturing apparatus, the drive frequency for the actuator is set on the basis of the drive frequency information, and the actuator is driven at the drive frequency set.

In the second aspect of the present technique, the drive frequency information that is used to set the drive frequency for the actuator included in the lens apparatus is generated, and the drive frequency information is transmitted to the lens apparatus.

Advantageous Effects of Invention

According to the first aspect or the second aspect of the present technique, the drive frequency for the actuator of the lens apparatus can be set appropriately. Further, the first aspect or the second aspect of the present technique allows reduction of possible noise in a captured image caused by a magnetic field generated when the actuator of the lens apparatus is driven, without any change in image capturing processing of the image capturing apparatus.

Note that the effects described here are not necessarily limited and any of the effects described in the present disclosure may be produced.

DESCRIPTION OF EMBODIMENTS

Embodiments of the present technique will be described below. The description will be made in the following order.
1. First Embodiment
2. Second Embodiment
3. Modified Example
4. Miscellaneous 1. First Embodiment First, with reference to FIGS. 1 to 5, a first embodiment of the present technique will be described.
<Configuration Example of Image Capturing System 11>

Figure 1:
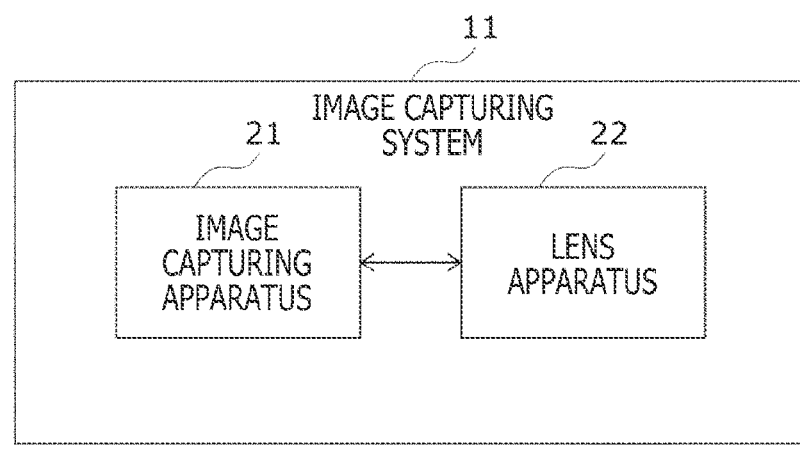
FIG. 1 is a block diagram illustrating a first embodiment of an image capturing system to which the present technique is applied.

FIG. 1 is a block diagram illustrating a configuration example of an image capturing system 11 to which the present technique is applied.

The image capturing system 11 includes an image capturing apparatus 21 and a lens apparatus 22.

The image capturing apparatus 21 includes, for example, a digital single-lens reflex camera (DSLR). The image capturing apparatus 21 enables mounting and replacement of the lens apparatus 22 and receives light from a subject via the lens apparatus 22 to capture an image of the subject.

Further, the image capturing apparatus 21 transmits and receives various types of information to and from the lens apparatus 22. For example, the image capturing apparatus 21 transmits, to the lens apparatus 22, drive frequency information used to set a drive frequency for an actuator of the lens apparatus 22. Further, for example, the image capturing apparatus 21 receives, from the lens apparatus 22, lens specification information related to the specifications of the lens apparatus 22 and setting information including, for example, a set value for the drive frequency for the lens apparatus 22.

The lens apparatus 22 includes various lenses and causes light from the subject to enter the image capturing apparatus 21. Note that the type of the lens included in the lens apparatus 22 is not particularly limited. Further, the lens apparatus 22 sets the drive frequency for the built-in actuator on the basis of the drive frequency information from the image capturing apparatus 21 and drives the actuator at the set drive frequency.
<Configuration Example of Image Capturing Apparatus 21>

Figure 2:
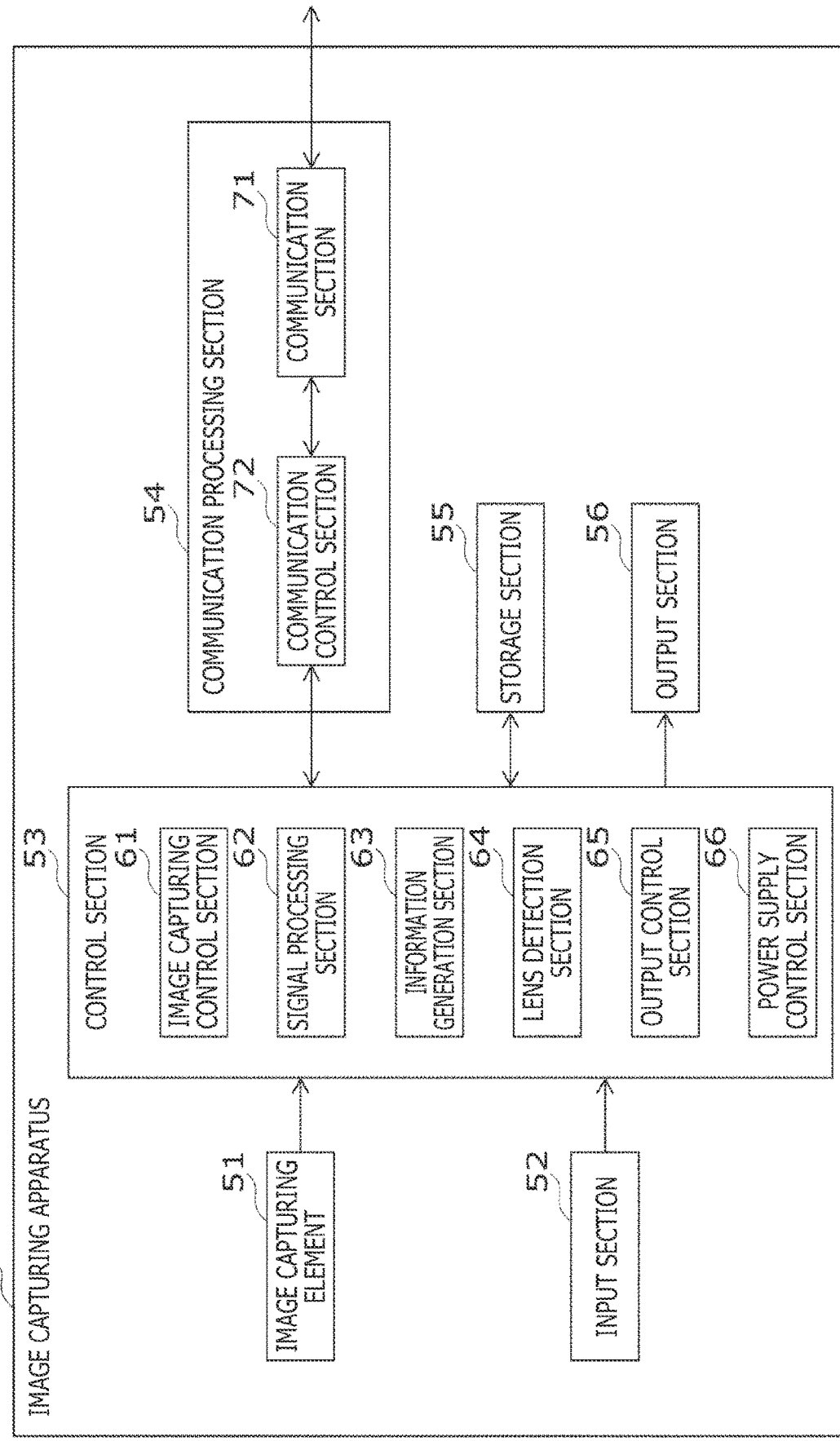
FIG. 2 is a block diagram illustrating the first embodiment of an image capturing apparatus to which the present technique is applied.

FIG. 2 illustrates a configuration example of the image capturing apparatus 21 in FIG. 1.

The image capturing apparatus 21 includes an image capturing element 51, an input section 52, a control section 53, a communication processing section 54, a storage section 55, and an output section 56.

Under the control of the control section 53, the image capturing element 51 receives light from the subject, which is incident via the lens apparatus 22, to capture an image of the subject. The image capturing element 51 feeds the control section 53 with an image signal including pixel signals output from pixels.

Note that the type of the image capturing element 51 is not particularly limited and that, for example, a CMOS (Complementary Metal Oxide Semiconductor) image sensor, a CCD (Charge Couple Device) image sensor, or the like is used as the image capturing element 51.

The input section 52 includes an apparatus used by a user to input various kinds of data, instructions, and the like. For example, the input section 52 includes operation devices such as a touch panel, buttons, a microphone, a switch, a lever, and a remote controller. The input section 52 generates input signals on the basis of data, instructions, and the like input by the user and feeds the input signals to the control section 53.

The control section 53 includes, for example, a processor such as a CPU (Central Processing Unit) or a DSP (Digital Signal Processor) and controls sections of the image capturing apparatus 21. The control section 53 functionally includes an image capturing control section 61, a signal processing section 62, an information generation section 63, a lens detection section 64, an output control section 65, and a power supply control section 66.

The image capturing control section 61 controls image capturing performed by the image capturing element 51. Further, the image capturing control section 61 sets an image capturing mode on the basis of an input signal from the input section 52 and executes image capturing processing according to the set image capturing mode. Note that the image capturing apparatus 21 can, for example, be provided with optional image capturing modes, such as a high image quality mode, a low image quality mode, a moving image capturing mode, a still image capturing mode, and a burst capture mode.

The signal processing section 62 executes various types of signal processing such as white balance adjustment processing, gamma correction processing, and linear interpolation processing on image signals fed from the image capturing element 51. The signal processing section 62 feeds an image signal resulting from signal processing to the communication processing section 54 and causes the image signal to be stored in the storage section 55 as necessary.

The information generation section 63 generates various kinds of information on the basis of the input information from the input section 52, the image captured by the image capturing element 51, the information stored in the storage section 55, and the like. For example, the information generation section 63 generates the drive frequency information described above. The information generation section 63 feeds the generated information to the sections of the image capturing apparatus 21 and causes the generated information to be stored in the storage section 55 as necessary.

The lens detection section 64 detects whether or not the lens apparatus 22 is mounted. Note that any method can be used to detect whether or not the lens apparatus 22 is mounted. For example, the method for detecting whether or not the lens apparatus 22 is mounted may be a detection method using hardware, a detection method using software, or a detection method using both hardware and software.

The output control section 65 controls output of visual information and audio information performed by the output section 56. For example, the output control section 65 controls display of an image based on an image capturing signal, output of voice based on an audio signal acquired by the input section 52, and the like.

The power supply control section 66 controls supply of power to the sections of the image capturing apparatus 21 and the lens apparatus 22.

The communication processing section 54 executes processing for communication with the lens apparatus 22. The communication processing section 54 includes a communication section 71 and the communication control section 72.

The communication section 71 includes, for example, various communication apparatuses, communication modules, and the like and communicates with the lens apparatus 22 under the control of the communication control section 72. Note that the communication section 71 may use any wired or wireless communication scheme. Further, the communication section 71 may correspond to plural communication schemes.

The communication control section 72 controls the communication section 71. Further, the communication control section 72 feeds information received from the lens apparatus 22 via the communication section 71, to the control section 53 and acquires, from the control section 53, information to be transmitted to the lens apparatus 22.

The storage section 55 stores information, programs, and the like required for processing by the image capturing apparatus 21.

The output section 56 includes, for example, a display or a speaker and outputs visual information such as images and audio information such as voices.

<Configuration Example of Lens Apparatus 22>

Figure 3:
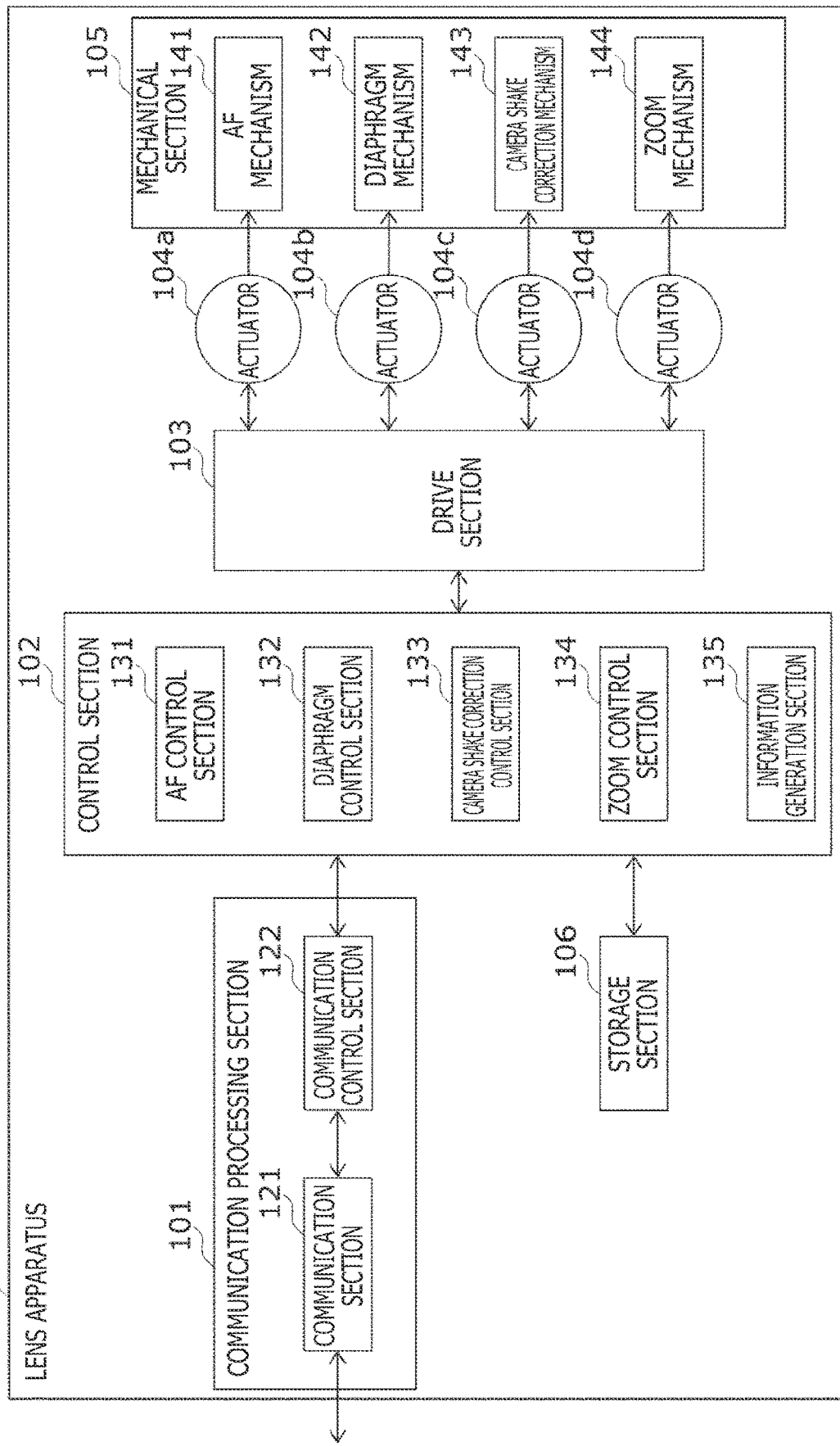
FIG. 3 is a block diagram illustrating a first embodiment of a lens apparatus to which the present technique is applied.

FIG. 3 illustrates a configuration example of the lens apparatus 22.

The lens apparatus 22 includes a communication processing section 101, a control section 102, a driving section 103, actuators 104a to 104d, a mechanical section 105, and a storage section 106.

The communication processing section 101 executes processing for communication with the image capturing apparatus 21. The communication processing section 101 includes a communication section 121 and a communication control section 122.

Under the control of the communication control section 122, the communication section 121 communicates with the image capturing apparatus 21 by using a scheme corresponding to the communication section 71 of the image capturing apparatus 21.

The communication control section 122 controls the communication section 121. Further, the communication control section 122 feeds information received from the image capturing apparatus 21 via the communication section 121, to the control section 102, and acquires information to be transmitted to the image capturing apparatus 21, from the control section 102.

The control section 102 includes, for example, processors such as a CPU (Central Processing Unit) and controls sections of the lens apparatus 22. The control section 102 functionally includes an AF (Auto Focus) control section 131, a diaphragm control section 132, a camera shake correction control section 133, a zoom control section 134, and an information generation section 135.

The AF control section 131, for example, controls driving of the actuator 104a by the driving section 103, to control an AF (Auto Focus) mechanism 141 of the mechanical section 105.

The diaphragm control section 132, for example, controls driving of the actuator 104b by the driving section 103, to control a diaphragm mechanism 142 of the mechanical section 105.

The camera shake correction control section 133, for example, controls driving of the actuator 104c by the driving section 103, to control a camera shake correction mechanism 143 of the mechanical section 105.

The zoom control section 134, for example, controls driving of the actuator 104d by the driving section 103, to control a zoom mechanism 144 of the mechanical section 105.

The information generation section 135 generates various types of information on the basis of, for example, information stored in the storage section 106. For example, the information generation section 135 generates the above-described lens specification information and setting information. The information generation section 135 feeds the generated information to the sections of the lens apparatus 22 and causes the generated information to be stored in the storage section 106 as necessary.

The driving section 103 includes, for example, a driver and the like and drives the actuators 104a to 104d.

The actuator 104a is used to, for example, control a movable section of the AF mechanism 141.

The actuator 104b is used to, for example, control a movable section of the diaphragm mechanism 142.

The actuator 104c is used to, for example, control a movable section of the camera shake correction mechanism 143.

The actuator 104d is used to, for example, control a movable section of the zoom mechanism 144.

Note that actuators based on any scheme can be used as the actuators 104a to 104d. For example, stepping motors, linear motors, DC motors, piezoelectric motors, or the like can be used as the actuators 104a to 104d. Further, each of the actuators 104a to 104d can be configured using plural actuators.

Note that the actuators 104a to 104d are simply referred to as the actuator 104 in a case where the actuators 104a to 104d need not be distinguished from one another.

The mechanical section 105 includes the AF mechanism 141, the diaphragm mechanism 142, the camera shake correction mechanism 143, and the zoom mechanism 144.

The AF mechanism 141 includes various types of hardware and the like for implementing an auto focus function.

The diaphragm mechanism 142 includes various types of hardware and the like for implementing diaphragm control.

The camera shake correction mechanism 143 includes various types of hardware and the like for implementing a camera shake correction function.

The zoom mechanism 144 includes various types of hardware and the like for implementing a zoom function.

Note that the same hardware may be shared among two or more of the AF mechanism 141, the diaphragm mechanism 142, the camera shake correction mechanism 143, and the zoom mechanism 144. In other words, the same hardware may be used for two or more of the AF mechanism 141, the diaphragm mechanism 142, the camera shake correction mechanism 143, and the zoom mechanism 144.

<Drive Frequency Notification Processing>

Now, with reference to a flowchart in FIG. 4, drive frequency notification processing executed by the image capturing apparatus 21 will be described.

The processing is, for example, started when the image capturing apparatus 21 is powered on and ended when the image capturing apparatus 21 is powered off.

In step S1, the lens detection section 64 determines whether or not the lens apparatus 22 is mounted. In a case where the lens apparatus 22 is determined not to be mounted, the processing proceeds to step S2. This corresponds to a case where the lens apparatus 22 is not mounted when the image capturing apparatus 21 is powered on.

In step S2, the lens detection section 64 determines whether or not mounting of the lens apparatus 22 has been performed. This determination processing is repeatedly executed until mounting of the lens apparatus 22 is determined to have been performed. In a case where mounting of the lens apparatus 22 is determined to have been performed, the processing proceeds to step S3. This corresponds to a case where the lens apparatus 22 is mounted after the image capturing apparatus 21 is powered on.

On the other hand, in step S1, in a case where the lens apparatus 22 is determined to have been mounted, the processing in step S2 is skipped, and the processing proceeds to step S3. This corresponds to a case where the lens apparatus 22 is mounted when the image capturing apparatus 21 is powered on.

In step S3, the communication control section 72 receives, via the communication section 71, lens specification information transmitted from the lens apparatus 22 in step S51 in FIG. 5 described below. The communication control section 72 feeds the lens specification information to the control section 53.

Note that the lens specification information includes, for example, the model name of the lens apparatus 22, information indicating whether or not the drive frequency for (the actuator 104 of) the lens apparatus 22 needs to be associated with the image capturing apparatus 21.

In step S4, the information generation section 63 determines, on the basis of the lens specification information, whether or not the drive frequency of the lens apparatus 22 needs to be associated with the image capturing apparatus 21. In a case where it is determined that the drive frequency for the lens apparatus 22 needs to be associated with the image capturing apparatus 21, the processing proceeds to step S5.

In step S5, the image capturing apparatus 21 transmits drive frequency information according to the image capturing mode.

Specifically, the information generation section 63 generates drive frequency information. The drive frequency information includes, for example, candidates for the drive frequency for each actuator 104 of the lens apparatus 22. The candidates for the drive frequency are drive frequencies recommended for reduction of motor noise and are hereinafter referred to as recommended drive frequencies.

The recommended drive frequencies are set from among drive frequencies at which, for example, the level of motor noise in the image capturing apparatus 21 is equal to or lower than an acceptable value (for example, drive frequencies at which striped noise in images (motor noise) is unnoticeable).

Note that the drive frequency at which the level of the motor noise is equal to or lower than the acceptable value varies depending on the intensity of the magnetic force of the lens apparatus 22. Thus, for example, the recommended drive frequencies may be set according to the intensity of the magnetic force of the lens apparatus 22, and information indicating the correspondence relation between the magnetic force of the lens apparatus 22 and the recommended drive frequencies may be included in the drive frequency information. Note that the magnetic force of the lens apparatus 22 refers to the magnetic force of a magnetic field generated from the actuator 104 in the lens apparatus 22 when the actuator 104 is driven.

For example, in a case where the magnetic force of the lens apparatus $22 \leq \times 1$ (mT) is satisfied, the recommended drive frequencies are not particularly set, and any drive frequencies are available. This corresponds to a case where the magnetic force of the lens apparatus 22 is weak and where the level of the motor noise is assumed to be equal to or lower than the acceptable value regardless of the drive frequency.

Note that ×1 may refer to the upper limit value of the magnetic force of the lens apparatus 22 at which value the drive frequency for each actuator 104 need not be set in association with the image capturing apparatus 21.

Further, for example, in a case of ×1 (mT)<magnetic force of the lens apparatus $22 \leq \times 2$ (mT), from among the drive frequencies at which, with the magnetic force within this range, the level of the motor noise is assumed to be equal to or lower than the acceptable value, one recommended drive frequency is set for each predetermined frequency range (for example, for every 10 kHz). For example, one recommended drive frequency is set for each of the frequency ranges from 20 to 30 kHz, from 30 to 40 kHz, . . . , and from 90 to 100 kHz.

For example, when the drive frequency of the actuator 104 of the lens apparatus 22 is set to a value greatly away from a default value corresponding to an optimum value, performance such as driving sound, servo characteristics, and power consumption may significantly be degraded. To avoid degradation of performance of the actuator 104, plural recommended drive frequencies are set over a wide range in a distributed manner, for example, as described above in the example. This enables the drive frequency for each actuator 104 to be set to a value close to the default value.

Note that all the frequencies within the range of the drive frequencies at which, with the magnetic force within the above-described range, the level of the motor noise is assumed to be equal to or lower than the acceptable value may be set as the recommended drive frequencies.

Further, for example, in a case where the magnetic force of the lens apparatus $22 \geq \times 2$ (mT) is satisfied, the lens apparatus 22 has a strong magnetic force, and thus, few frequencies are assumed to be the drive frequencies at which the level of the motor noise is assumed to be equal to or lower than the acceptable value. As such, for example, all the frequencies within the range of the drive frequencies at which, with the magnetic force within the above-described range, the level of the motor noise is assumed to be equal to or lower than the acceptable value are set as the recommended drive frequencies.

Note that the information included in the drive frequency information is, for example, prestored in the storage section 55. For example, the correspondence relation between the magnetic force of the lens apparatus 22 and the recommended drive frequencies is determined in advance by design, actual measurement, or the like and stored in the storage section 55.

Further, for example, a read timing for a pixel signal for each pixel in the image capturing element 51 varies depending on the image capturing mode, and thus the drive frequency at which the level of the motor noise is equal to or lower than the acceptable value may vary. Thus, for example, the recommended drive frequencies corresponding to each image capturing mode are determined in advance by design, actual measurement, or the like and stored in the storage section 55. Then, the information generation section 63 generates drive frequency information including the recommended drive frequencies corresponding to each image capturing mode.

The information generation section 63 feeds the drive frequency information to the communication control section 72. The communication control section 72 transmits the drive frequency information to the lens apparatus 22 via the communication section 71. When the lens apparatus 22 is thus mounted on the image capturing apparatus 21 or when the image capturing mode is changed as described below, the image capturing apparatus 21 transmits, to the lens apparatus 22, the drive frequency information corresponding to the image capturing mode.

The lens apparatus 22 receives the drive frequency information in step S52 or step S57 in FIG. 5 described below and transmits setting information including set values for the drive frequencies in step S56.

In step S6, the communication control section 72 receives the setting information from the lens apparatus 22 via the communication section 71. The communication control section 72 feeds the setting information to the control section 53.

In step S7, the image capturing control section 61 determines, on the basis of an input signal from the input section 52, whether or not the image capturing mode has been changed. In a case where the image capturing mode is determined not to have been changed, the processing proceeds to step S8.

In step S8, the lens detection section 64 determines whether or not the lens apparatus 22 has been removed. In a case where the lens apparatus 22 is determined not to have been removed, the processing returns to step S7.

Subsequently, the processing in step S7 and step S8 is repeatedly executed until the image capturing mode is determined to have been changed in step S7 or the lens apparatus 22 is determined to have been removed in step S8.

On the other hand, in step S7, in a case where the image capturing mode is determined to have been changed, the processing returns to step S5, and step S5 and the subsequent processing are executed. Accordingly, in response to a change in image capturing mode, the drive frequency information including the recommended drive frequencies corresponding to the image capturing mode resulting from the change is transmitted to the lens apparatus 22.

Further, in step S8, in a case where the lens apparatus 22 is determined to have been removed, the processing returns to step S2 to execute step S2 and the subsequent processing.

Further, in step S4, in a case where it is determined that the drive frequency of the lens apparatus 22 need not be associated with the image capturing apparatus 21, the processing proceeds to step S9.

In step S9, as is the case with the processing in step S8, whether or not the lens apparatus 22 has been removed is determined. The determination processing is repeatedly executed until the lens apparatus 22 is determined to have been removed. Then, in a case where the lens apparatus 22 is determined to have been removed, the processing returns to step S2 to execute step S2 and the subsequent processing.

In other words, the drive frequency for the lens apparatus 22 need not be associated with the image capturing apparatus 21, and thus, the drive frequency information is not transmitted to the lens apparatus 22.

Note that, even in a case where it is determined that the drive frequency of the lens apparatus 22 need not be associated with the image capturing apparatus 21, the drive frequency information may be transmitted to the lens apparatus 22.

<Drive Frequency Setting Processing>

Next, description will be given of drive frequency setting processing executed by the lens apparatus 22 in response to drive frequency notification processing of the image capturing apparatus 21 in FIG. 4.

Note that the processing is, for example, started when the lens apparatus 22 is mounted on the image capturing apparatus 21 and ended when the lens apparatus 22 is removed from the image capturing apparatus 21.

In step S51, the lens apparatus 22 transmits the lens specification information.

Specifically, the information generation section 135 generates the lens specification information. The lens specification information includes, for example, the model name of the lens apparatus 22 and information indicating whether or not the drive frequency for (the actuator 104 of) the lens apparatus 22 needs to be associated with the image capturing apparatus 21, as described above.

Note that, for example, in a case where at least one of the actuators 104 generates a periodically varying magnetic field during driving, the drive frequency of the actuator 104 needs to be associated with the image capturing apparatus 21. For example, this is assumed to be a case where at least one of the actuators 104 is a stepping motor, a linear motor, or a DC motor and is PWM-driven.

On the other hand, for example, in a case where none of the actuators 104 generates a periodically varying magnetic field during driving, the drive frequency of the actuator 104 need not be associated with the image capturing apparatus 21. This is assumed to be, for example, a case where all of the actuators 104 are piezoelectric motors or where none of the actuators 104 are PWM-driven.

Note that the information to be included in the lens specification information is, for example, prestored in the storage section 106.

The information generation section 135 feeds the lens specification information to the communication control section 122. The communication control section 122 transmits the lens specification information to the image capturing apparatus 21 via the communication section 121.

In step S52, the communication control section 122 determines whether or not the drive frequency information has been received. The determination processing is repeatedly executed until the drive frequency information is determined to have been received. Then, in a case where the communication control section 122 receives, via the communication section 121, the drive frequency information transmitted by the image capturing apparatus 21 in step S5 in FIG. 4 described above, the processing proceeds to step S53.

In step S53, the lens apparatus 22 determines whether or not any drive frequency can be set.

Specifically, the communication control section 122 feeds the drive frequency information to the control section 102.

The control section 102 identifies the recommended drive frequencies on the basis of the drive frequency information and the magnetic force of the lens apparatus 22. Note that the magnetic force of the lens apparatus 22 is, for example, premeasured and prestored in the storage section 106.

In a case where the identified recommended drive frequencies include a frequency that can be set for at least one actuator 104, the control section 102 determines that there is a drive frequency that can be set, and the processing proceeds to step S54.

In step S54, the lens apparatus 22 sets the drive frequency on the basis of the drive frequency information.

Specifically, the AF control section 131 sets the drive frequency for the actuator 104*a* on the basis of the recommended drive frequencies identified by the processing in step S53.

For example, in a case where the magnetic force of the lens apparatus $22 \le \times 1$ (mT) is satisfied, no particular recommended drive frequencies are set as described above, and thus, the AF control section 131 sets the drive frequency for the actuator 104*a* to a default value.

On the other hand, in a case where the magnetic force of the lens apparatus $22 > \times 1$ (mT) is satisfied, when the recommended drive frequencies include a frequency that can be set for the actuator 104*a*, the AF control section 131 sets the drive frequency for the actuator 104*a* to that recommended drive frequency. Note that in a case where plural recommended drive frequencies can be set, for example, the AF control section 131 sets, as the drive frequency for the actuator 104*a*, one of the recommended drive frequencies closest to the default value of the drive frequency for the actuator 104*a*.

On the other hand, in a case where the recommended drive frequencies include no frequency that can be set for the actuator 104*a*, the AF control section 131 sets the drive frequency for the actuator 104*a* to the default value. This is assumed to correspond to, for example, a case where the performance of the actuator 104*a* is significantly degraded in a case where the drive frequency for the actuator 104*a* is set equal to the recommended drive frequency.

Under the control of the AF control section 131, the driving section 103 drives the actuator 104*a* at the set drive frequency.

The diaphragm control section 132, the camera shake correction control section 133, and the zoom control section 134 also set the drive frequencies for the actuator 104*b*, the actuator 104*c*, and the actuator 104*d* by using a method similar to the method of the AF control section 131. Then, the actuator 104*b*, the actuator 104*c*, and the actuator 104*d* are each driven at the respective set drive frequencies.

Note that the drive frequencies for the actuators 104 may be different from each other.

Subsequently, the processing proceeds to step S56.

On the other hand, in step S53, in a case where the identified recommended drive frequencies include no frequencies that can be set for any of the actuators 104, the control section 102 determines that no drive frequencies can be set, and the processing proceeds to step S55.

In step S55, the lens apparatus 22 sets the drive frequency to the default value. In other words, the AF control section 131, the diaphragm control section 132, the camera shake correction control section 133, and the zoom control section 134 set the drive frequencies for the actuators 104*a* to 104*d* to the respective default values. Then, the actuators 104*a* to 104*d* are driven at the drive frequencies of the default values.

Subsequently, the processing proceeds to step S56.

In step S56, the lens apparatus 22 transmits the setting information. Specifically, the information generation section 135 generates setting information including set values for the drive frequencies for the actuators 104. Note that, in a case where any of the actuators 104 cannot be set to have the recommended drive frequency, information indicating that setting to the recommended drive frequency is unavailable is included in the setting information.

The information generation section 135 feeds the setting information to the communication control section 122. The communication control section 122 transmits the setting information to the image capturing apparatus 21 via the communication section 121.

In step S57, as is the case with the processing in step S52, whether or not the drive frequency information has been received is determined. The determination processing is repeatedly executed until the drive frequency information is determined to have been received. Then, in a case where the drive frequency information is determined to have been received, the processing returns to step S53 to execute step S53 and the subsequent processing. This is assumed to correspond to a case where the image capturing mode for the image capturing apparatus 21 is changed and new drive frequency information is transmitted from the image capturing apparatus 21, and the drive frequencies for the actuators 104 are reset on the basis of the new drive frequency information.

As described above, the drive frequencies for the actuators 104 are appropriately set. In other words, in a case where the lens apparatus 22 has a low magnetic force, the drive frequencies for the actuators 104 are set to the respective default values. On the other hand, in a case where the lens apparatus 22 has a high magnetic force, the drive frequencies for the actuators 104 are set to values at which the level of the motor noise is reduced to the acceptable value or smaller.

Further, the image capturing processing (for example, the read-out timing for the pixel signal or the like) of the image capturing apparatus 21 need not be changed. This prevents degradation of performance (for example, functions, processing speed, and the like) of the image capturing apparatus 21 due to reduction of the motor noise.

Furthermore, no new hardware component needs to be added to the image capturing apparatus 21 or the lens apparatus 22. This allows prevention of a rise in required costs and an increase in the size of the apparatus.

Further, the present technique can be implemented basically by notifying the lens apparatus of the recommended drive frequencies by the image capturing apparatus, thus improving flexibility of the image capturing system.

For example, in a case where a new image capturing apparatus is developed, the new image capturing apparatus can be associated with the existing lens apparatus only by transmitting, from the image capturing apparatus, the drive frequency information including the recommended drive frequencies.

Further, for example, in a case where a new lens apparatus is developed, the new lens apparatus can be associated with the existing image capturing apparatus only by receiving the drive frequency information from the image capturing apparatus. Moreover, the need to take the effects of the motor noise into account is reduced, and thus, for example, flexibility of types and arrangement of the actuators used for the new lens apparatus is improved.

Note that, for example, for reduction of the motor noise, a method for DC-driving the actuators 104 instead of PWM-driving the actuators 104 is possible. However, the DC driving requires more power consumption than the PWM driving. In this regard, the use of the above-described method allows the motor noise to be reduced while preventing an increase in power consumption.

2. Second Embodiment

Now, with reference to FIGS. 6 to 15, a second embodiment of the present technique will be described.

<Configuration Example of Image Capturing System 201>

Figure 6:
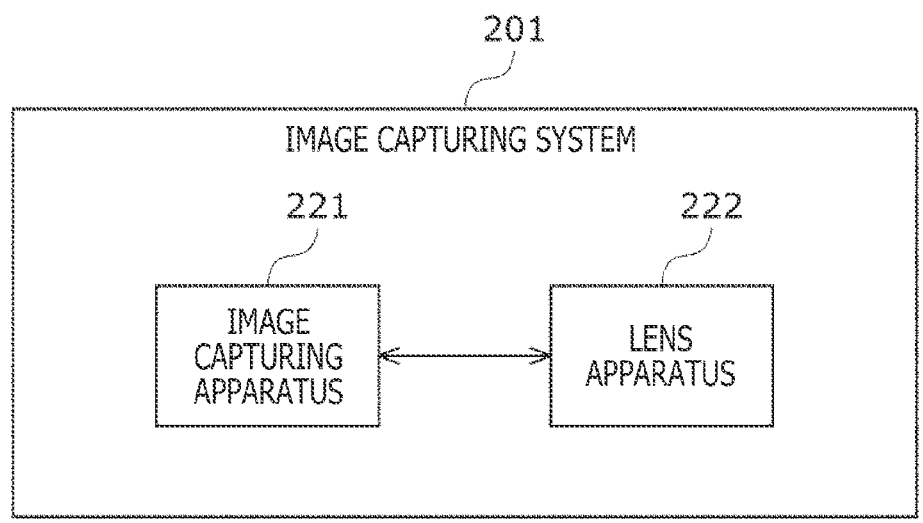
FIG. 6 is a block diagram illustrating a second embodiment of an image capturing system to which the present technique is applied.

FIG. 6 is a block diagram illustrating a configuration example of an image capturing system 201 to which the present technique is applied.

The image capturing system 201 includes an image capturing apparatus 221 and a lens apparatus 222.

Similarly to the image capturing apparatus 221 in FIG. 1, the image capturing apparatus 221 includes, for example, a DSLR. The image capturing apparatus 221 enables mounting and replacement of the lens apparatus 222 and receives light from the subject via the lens apparatus 222 to capture an image of the subject.

Further, the image capturing apparatus 221 transmits and receives various types of information to and from the lens apparatus 222. For example, the image capturing apparatus 221 transmits a communication command correspondence list and drive frequency information used to set the drive frequencies for the actuators of the lens apparatus 222 to the lens apparatus 222. For example, the image capturing apparatus 221 receives, from the lens apparatus 222, the communication command correspondence list, reference drive frequency information including reference drive frequencies for the actuators of the lens apparatus 222, and the setting information including set values for the drive frequencies for the lens apparatus 222 and the like.

Here, the communication command correspondence list refers to a list indicating communication commands that can be supported by the image capturing apparatus 221 or the lens apparatus 222. In other words, the communication command correspondence list refers to a list indicating communication commands that can be transmitted and received by the image capturing apparatus 221 or the lens apparatus 222 and that allow the image capturing apparatus 221 or the lens apparatus 222 to execute indicated processing. The communication commands include, for example, a drive frequency switching communication command for switching (changing) the drive frequency for the lens apparatus 222.

Further, the reference drive frequencies refer to frequencies preset to drive the actuators of the lens apparatus 222 in a case where the lens apparatus 222 is mounted on the image capturing apparatus 221 not supporting communication. Even in a case where the image capturing apparatus 221 supports communication, the actuators of the lens apparatus 222 are driven at the reference drive frequencies unless a particular change is indicated. Note that different reference drive frequencies may individually be set for the respective actuators or a common reference drive frequency may be set for all the actuators.

The lens apparatus 222 includes various lenses to make light from the subject incident on the image capturing apparatus 221. Note that the types of the lenses included in the lens apparatus 222 are not particularly limited. Further, the lens apparatus 222 sets the drive frequencies for the built-in actuators on the basis of the drive frequency information from the image capturing apparatus 221 and drives the actuators at the set drive frequencies.

<Configuration Example of Image Capturing Apparatus 221>

Figure 7:
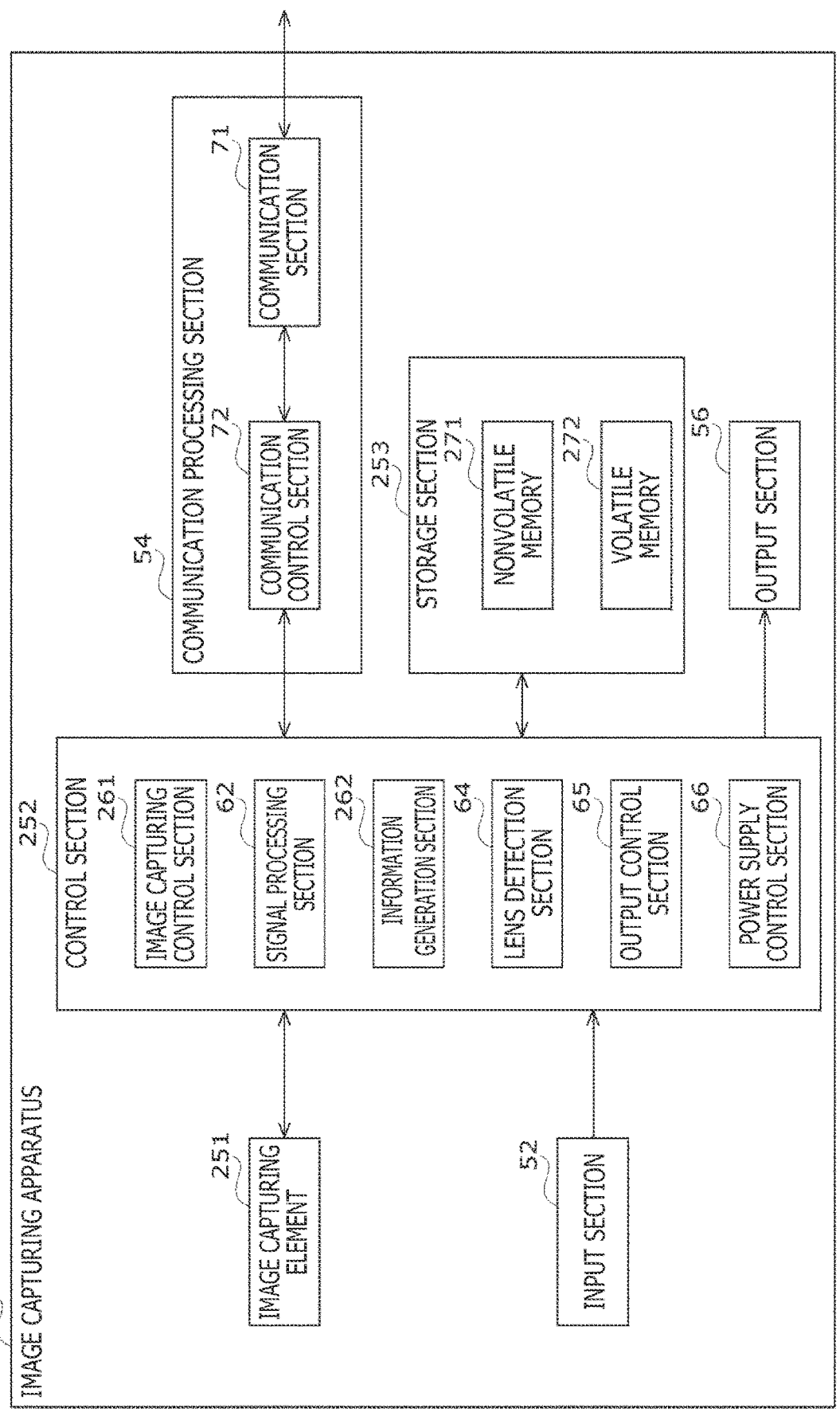
FIG. 7 is a block diagram illustrating a second embodiment of an image capturing apparatus to which the present technique is applied.

FIG. 7 illustrates a configuration example of the image capturing apparatus 221 in FIG. 6. Note that portions in FIG. 7 corresponding to the image capturing apparatus 21 in FIG. 2 are denoted by the same reference signs and that description of the portions is omitted as appropriate.

The image capturing apparatus 221 matches the image capturing apparatus 21 in that the image capturing apparatus 221 also includes the input section 52, the communication processing section 54, and the output section 56 but differs from the image capturing apparatus 21 in that the image capturing apparatus 221 includes an image capturing element 251, a control section 252, and a storage section 253 instead of the image capturing element 51, the control section 53, and the storage section 55.

Similarly to the image capturing element 51, under the control of the control section 252, the image capturing element 251 receives light from the subject incident via the lens apparatus 222, to capture an image of the subject. The image capturing element 251 feeds the control section 252 with an image signal including pixel signals output from the pixels.

Further, under the control of the control section 252, the image capturing element 251 changes a driving mode (hereinafter referred to as the imager mode). Furthermore, the image capturing element 251 feeds the control section 252 with imager mode change information for giving notice of a change in the imager mode.

Note that, for example, in a case where the image capturing apparatus 221 captures a still image, the imager mode is set on the basis of a combination of operation of the image capturing apparatus 221, image size, and the like.

The operation of the image capturing apparatus 221 is assumed to be, for example, still image live view, still image auto focusing, still image capturing, and the like. The image size is assumed to be, for example, a full size, APS (Advanced Photo System)-C, and the like.

Further, for example, in a case where the image capturing apparatus 221 captures a moving image, the imager mode is set on the basis of a combination of standards for video signals, a resolution, a frame rate, an image size, and the like.

The standards for video signals are assumed to be, for example, NTSC (National Television System Committee), PAL (Phase Alternating Line), or the like. The resolution is assumed to be, for example, 4K, HD (High Definition video), AVCHD (Advanced Video Coding High Definition), or the like. The frame rate is assumed to be, for example, 24P, 25P, 30P, 50P, 60P, 100P, 120P, 50I, 60I, or the like. The image size is assumed to be, for example, the full size, APS-C, or the like.

Note that, for example, in a case where the image capturing apparatus 221 reproduces a still image or a moving image on the basis of an image signal stored in a nonvolatile memory 271, the image capturing element 251 is turned off and the imager mode is unset.

The control section 252 matches the control section 53 in that the control section 252 includes the signal processing section 62, the lens detection section 64, the output control section 65, and the power supply control section 66, and matches the control section 53 in that the control section 252 includes an image capturing control section 261 and an information generation section 262 instead of the image capturing control section 26 and the information generation section 63.

The image capturing control section 261 controls image capturing performed by the image capturing element 251. Further, the image capturing control section 261 sets the image capturing mode on the basis of, for example, an input signal from the input section 52, and executes image capturing processing according to the set image capturing mode. Further, the image capturing control section 261 instructs the image capturing element 251 to change the imager mode, on the basis of, for example, an input signal from the input section 52 and an operation sequence of the image capturing apparatus 221, and receives, from the image capturing element 251, imager mode change information indicating the imager mode resulting from the change.

The information generation section 262 generates various types of information on the basis of input information from the input section 52, an image captured by the image capturing element 251, information stored in the storage section 253, and the like. For example, the information generation section 262 generates the above-described drive frequency information. The information generation section 262 feeds the generated information to the sections of the image capturing apparatus 221 and causes the information to be stored in the storage section 253 as necessary. Further, for example, the information generation section 262 reads out information stored in the storage section 253 and feeds the information to the sections of the image capturing apparatus 221 as necessary.

The storage section 253 includes the nonvolatile memory 271 and a volatile memory 272 and stores information, programs, and the like required for processing of the image capturing apparatus 221.

The nonvolatile memory 271 includes, for example, a hard disk drive, a flash memory, a ROM (Read Only Memory), or the like.

The volatile memory 272 includes, for example, a RAM (Random Access Memory) or the like.

<Configuration Example of Lens Apparatus 222>

Figure 8:
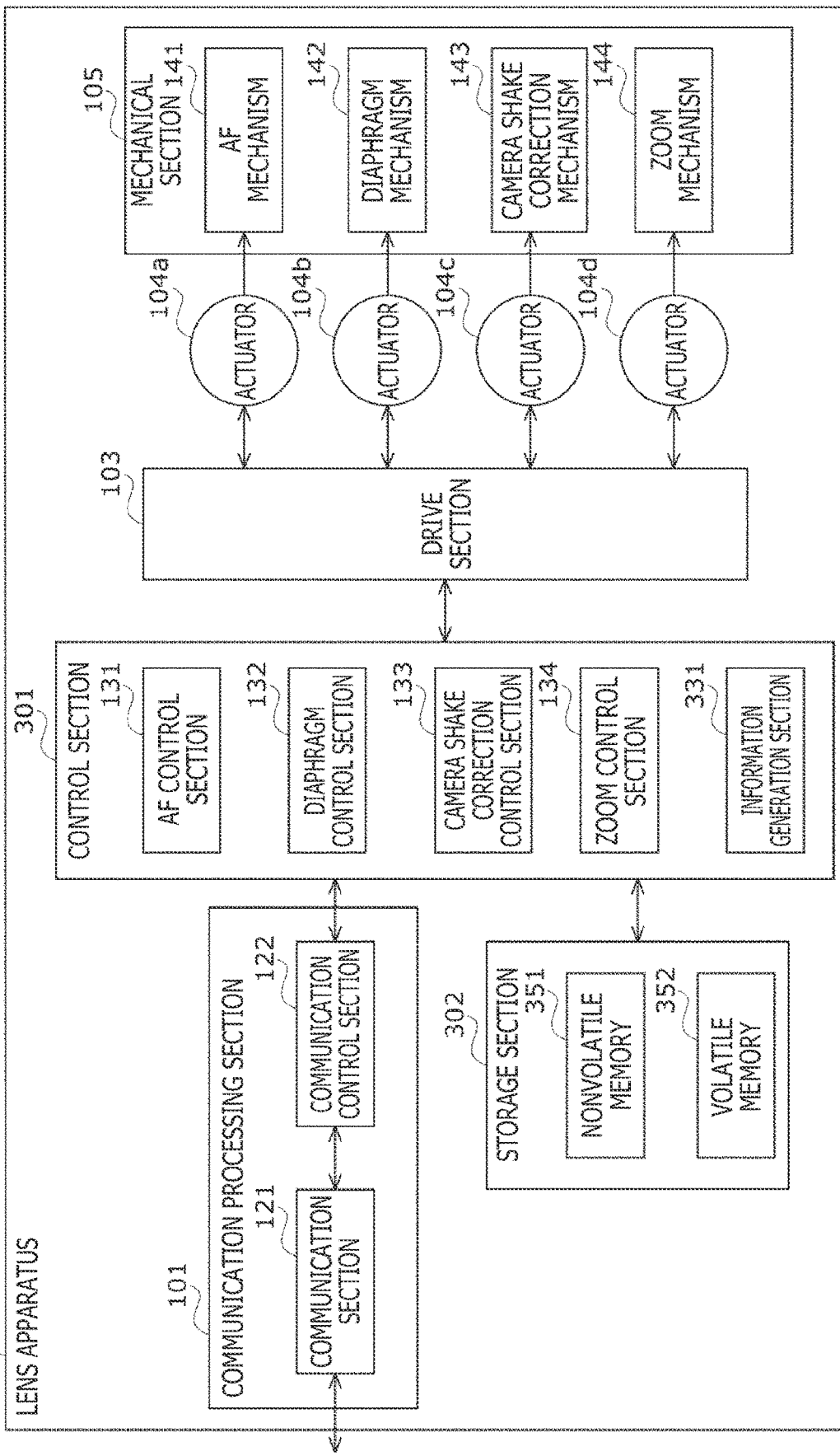
FIG. 8 is a block diagram illustrating a second embodiment of a lens apparatus to which the present technique is applied.

FIG. 8 illustrates a configuration example of the lens apparatus 222. Note that portions in FIG. 8 corresponding to the lens apparatus 22 in FIG. 3 are denoted by the same reference signs and that description of the portions is omitted as appropriate.

The lens apparatus 222 matches the lens apparatus 22 in that the lens apparatus 222 includes the communication processing section 101, the driving section 103, the actuators 104a to 104d, and the storage section 106 but differs from the lens apparatus 22 in that the lens apparatus 222 includes a control section 301 and a storage section 302 instead of the control section 102 and the storage section 106.

The control section 301 matches the control section 102 in that the control section 301 includes the AF control section 131, the diaphragm control section 132, the camera shake correction control section 133, and the zoom control section 134 but differs from the control section 102 in that the control section 301 includes the information generation section 331 instead of the information generation section 135.

The information generation section 331 generates various types of information on the basis of, for example, information stored in the storage section 302. For example, the information generation section 331 generates setting information. The information generation section 331 feeds the generated information to the sections of the lens apparatus 222 and causes the information to be stored in the storage section 302 as necessary. Further, for example, the information generation section 331 reads out information stored in the storage section 302 and feeds the information to the sections of the lens apparatus 222 as necessary.

The storage section 302 includes a nonvolatile memory 351 and a volatile memory 352 and stores information, programs, and the like required for processing of the lens apparatus 222.

The nonvolatile memory 351 includes, for example, a flash memory, a ROM, or the like.

The volatile memory 352 includes, for example, a RAM or the like.

<Drive Frequency Notification Processing>

Figure 9:
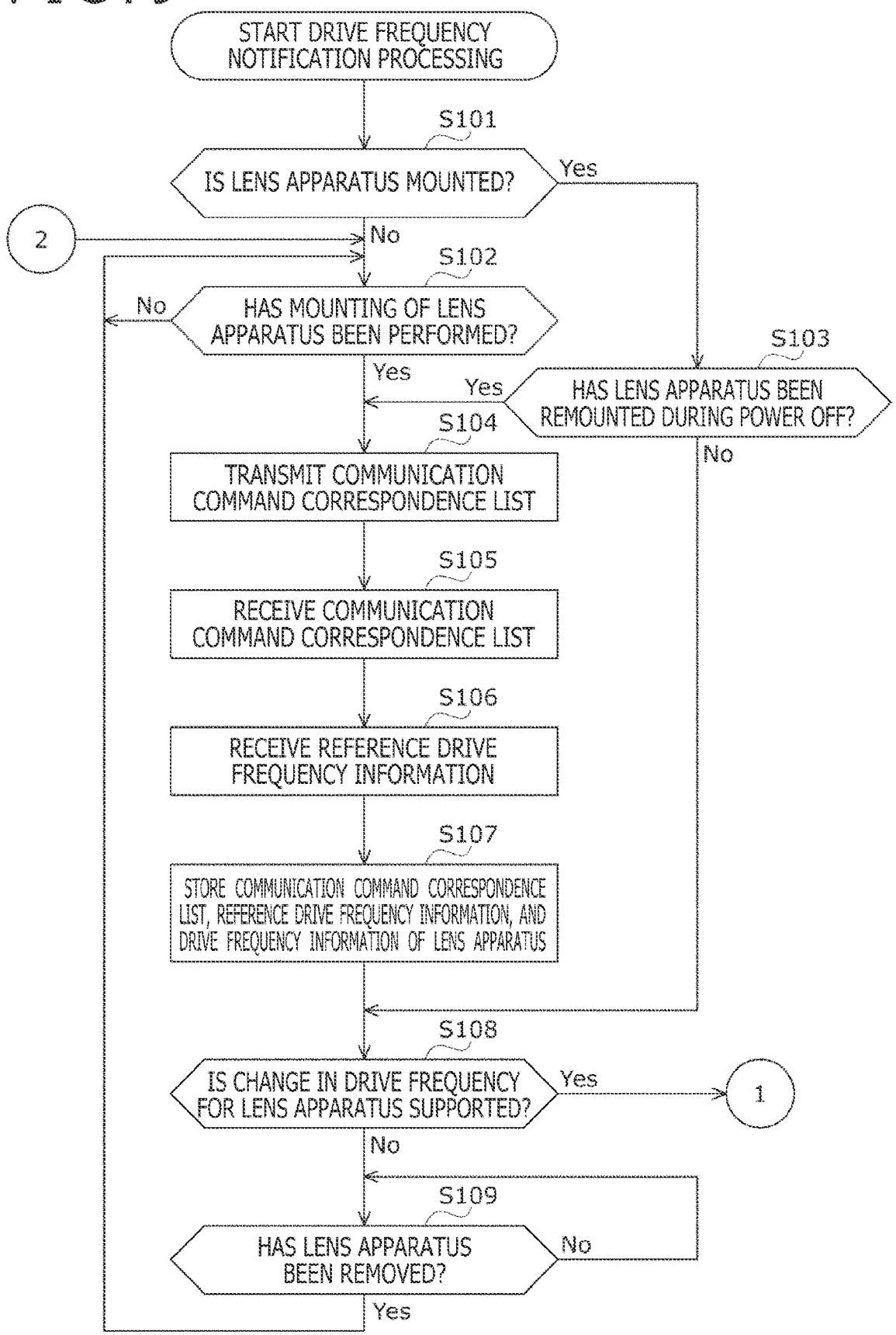
FIG. 9 is a flowchart illustrating drive frequency notification processing executed by the image capturing apparatus in FIG. 7.
Figure 10:
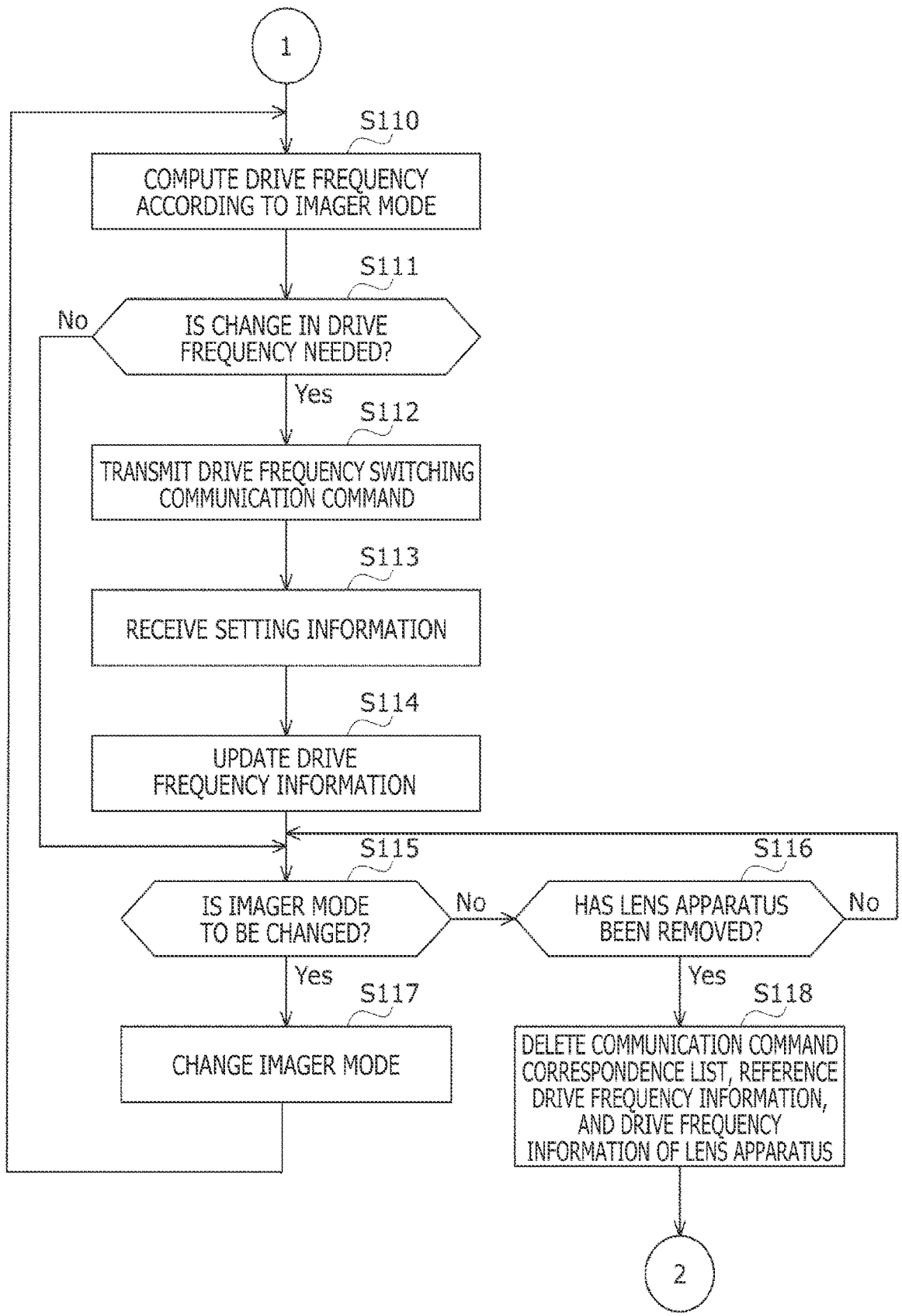
FIG. 10 is a flowchart illustrating the drive frequency notification processing executed by the image capturing apparatus in FIG. 7.

Now, with reference to flowcharts in FIG. 9 and FIG. 10, drive frequency notification processing executed by the image capturing apparatus 221 will be described below.

The processing is, for example, started when the image capturing apparatus 221 is powered on and ended when the image capturing apparatus 221 is powered off.

Figure 4:
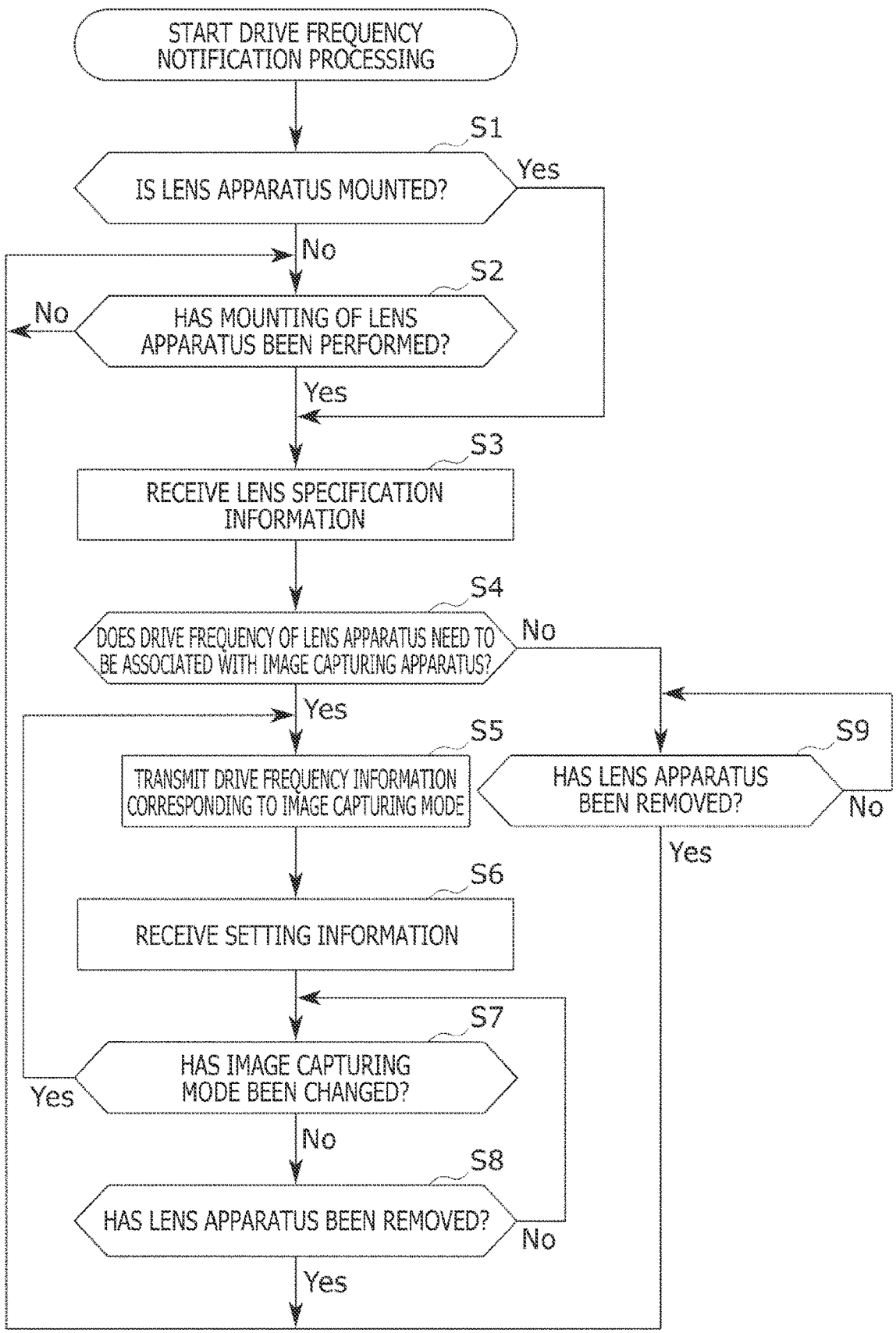
FIG. 4 is a flowchart illustrating drive frequency notification processing executed by the image capturing apparatus in FIG. 2.

In step S101, as is the case with the processing in step S1 in FIG. 4, whether or not the lens apparatus 222 is mounted is determined. In a case where the lens apparatus 222 is determined not to be mounted, the processing proceeds to step S102.

In step S102, as is the case with the processing in step S2 in FIG. 4, whether or not mounting of the lens apparatus 222 has been performed is determined. This determination processing is repeatedly executed until mounting of the lens apparatus 222 is determined to have been performed. In a case where mounting of the lens apparatus 222 is determined to have been performed, the processing proceeds to step S104.

On the other hand, in step S101, in a case where the lens apparatus 222 is determined to be mounted, the processing proceeds to step S103.

In step S103, the lens detection section 64 determines whether or not the lens apparatus 222 has been remounted during power off. For example, in a case where the communication command correspondence list of the lens apparatus 222 is not stored in the nonvolatile memory 271, the lens detection section 64 determines that the lens apparatus 222 has been remounted during power off.

Further, for example, in a case where the lens apparatus 222 is removed during power off, the lens detection section 64 detects that the lens apparatus 222 has been removed and causes a history of removal of the lens apparatus 222 to be stored in the nonvolatile memory 271. Then, in a case where the history of removal of the lens apparatus 222 is stored in the nonvolatile memory 271, the lens detection section 64 determines that the lens apparatus 222 has been remounted during power off. This corresponds to a case where the lens apparatus 222 is temporarily removed from the image capturing apparatus 221 and where the same or a different lens apparatus 222 is remounted on the image capturing apparatus 221 during power off.

Then, in a case where the lens apparatus 222 is determined to have been remounted during power off, the processing proceeds to step S104.

In step S104, the image capturing apparatus 221 transmits the communication command correspondence list. Specifically, the information generation section 262 reads out the communication command correspondence list of the image capturing apparatus 221 stored in the nonvolatile memory 271 of the storage section 253 and feeds the communication command correspondence list to the communication control section 72. The communication control section 72 transmits the communication command correspondence list of the image capturing apparatus 221 to the lens apparatus 222 via the communication section 71.

Figure 11:
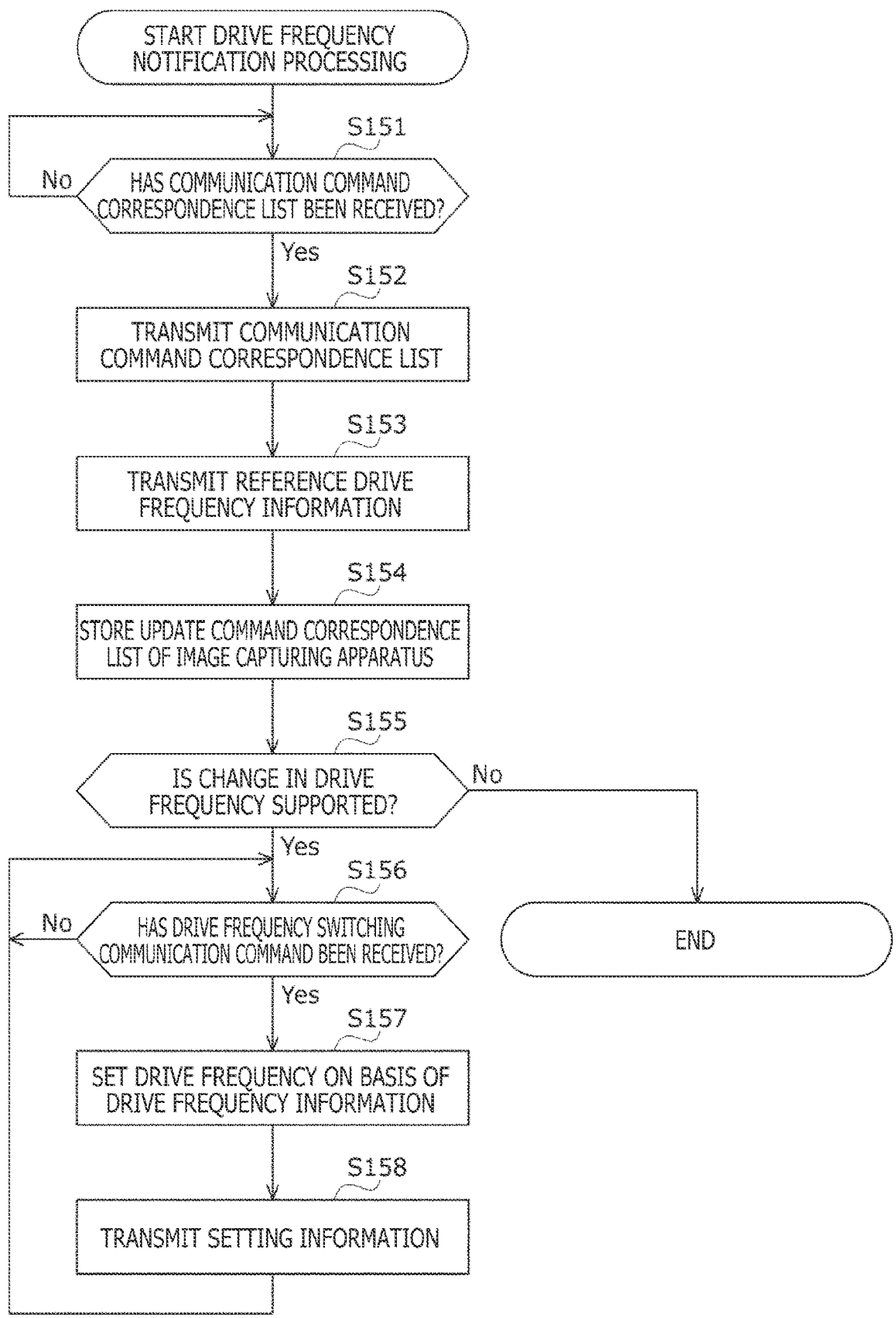
FIG. 11 is a flowchart illustrating the drive frequency setting processing executed by the lens apparatus in FIG. 8.

In step S105, the communication control section 72 receives, via the communication section 71, the communication command correspondence list of the lens apparatus 222 transmitted from the lens apparatus 222 in step S152 in FIG. 11 described below. The communication control section 72 feeds the communication command correspondence list of the lens apparatus 222 to the control section 252.

In step S106, the communication control section 72 receives, via the communication section 71, reference drive frequency information transmitted from the lens apparatus 222 in step S153 in FIG. 11 described below. The communication control section 72 feeds the reference drive frequency information to the control section 252.

In step S107, the image capturing apparatus 221 stores the communication command correspondence list, the reference drive frequency information, and the drive frequency information of the lens apparatus 222. Specifically, the information generation section 262 causes the latest communication command correspondence list and reference drive frequency information received from the lens apparatus 222 to be stored in the nonvolatile memory 271. At this time, in a case where an old communication command correspondence list and old reference drive frequency information are left in the nonvolatile memory 271, the information generation section 262 overwrites the old communication command correspondence list and old reference drive frequency information with the latest communication command correspondence list and reference drive frequency information.

Further, the image capturing apparatus 221 generates drive frequency information including the drive frequency for the lens apparatus 222 set equal to reference drive frequency indicated in the reference drive frequency information and causes the drive frequency information to be stored in the volatile memory 272. At this time, in a case where old drive frequency information is left in the volatile memory 272, the information generation section 262 overwrites the old drive frequency information with the latest drive frequency information.

Subsequently, the processing proceeds to step S108.

On the other hand, in step S103, in a case where the communication command correspondence list of the lens apparatus 22 is stored in the nonvolatile memory 271 and the history of removal of the lens apparatus 222 is not stored in the nonvolatile memory 271, the lens detection section 64 determines that the lens apparatus 222 has been mounted before power off instead of during power off. The processing from step S104 to step S107 is skipped, and the processing proceeds to step S108.

In step S108, the information generation section 262 determines whether or not a change in the drive frequency for the lens apparatus 222 can be supported. In a case where at least one of the communication command correspondence lists of the image capturing apparatus 221 and the lens apparatus 222 does not include a drive frequency switching communication command for switching the drive frequency for the lens apparatus 222, a determination is made that a change in the drive frequency for the lens apparatus 222 cannot be supported, and the processing proceeds to step S109.

In step S109, as is the case with the processing in step S8 in FIG. 4, whether or not the lens apparatus 222 has been removed is determined. This determination processing is repeatedly executed until the lens apparatus 222 is determined to have been removed. Then, in a case where the lens apparatus 222 is determined to have been removed, the processing returns to step S102 to execute step S102 and the subsequent processing.

On the other hand, in step S108, in a case where both communication command correspondence lists of the image capturing apparatus 221 and the lens apparatus 222 include the drive frequency switching communication command, the information generation section 262 determines that a change in the drive frequency for the lens apparatus 222 can be supported, and the processing proceeds to step S110.

In step S110, the information generation section 262 computes the drive frequency corresponding to the imager mode. For example, the information generation section 262 computes the drive frequency for each actuator 104 at which the level of the motor noise of the image capturing apparatus 221 is equal to or lower than the acceptable value, the drive frequency being within a predetermined frequency band around the reference drive frequency (hereinafter referred to as the settable band), in the current imager mode.

Note that any method for computing the drive frequency may be used. Further, for example, data such as the settable band which is required for computation of the drive frequency is prestored in the nonvolatile memory 271 or transmitted from the lens apparatus 222 along with the communication command correspondence list.

In step S111, the information generation section 262 determines whether or not the drive frequency needs to be changed. For example, in a case where, at the current drive frequency, the level of the motor noise of the image capturing apparatus 221 is higher than the acceptable value and the settable band includes drive frequencies at which the level of the motor noise of the image capturing apparatus 221 is equal to or lower than the acceptable value, the information generation section 262 determines that the drive frequency needs to be changed, and the processing proceeds to step S112.

In step S112, the image capturing apparatus 221 transmits the drive frequency switching communication command. For example, the information generation section 262 selects, from among the drive frequencies within the settable band at which the level of the motor noise of the image capturing apparatus 221 is equal to or lower than the acceptable value, the one drive frequency at which the motor noise is minimized. The information generation section 262 generates drive frequency information including the selected drive frequency, generates a drive frequency switching communication command including the drive frequency information, and feeds the drive frequency switching communication command to the communication control section 72. The communication control section 72 transmits the drive frequency switching communication command to the lens apparatus 222 via the communication section 71.

As described above, when the lens apparatus 222 is mounted on the image capturing apparatus 221 or when the imager mode is changed as described below, the drive frequency information corresponding to the image capturing mode is transmitted from the image capturing apparatus 221 to the lens apparatus 222.

In step S113, as is the case with the processing in step S6 in FIG. 4, the setting information is received.

In step S114, the information generation section 262 updates the drive frequency information. Specifically, the information generation section 262 overwrites the drive frequency information stored in the volatile memory 272 with the drive frequency information generated by the processing in step S112. Note that the drive frequency information stored in the volatile memory 272 is deleted when the image capturing apparatus 221 is powered off.

Subsequently, the processing proceeds to step S115.

On the other hand, in step S111, for example, in a case where, at the current drive frequency, the level of the motor noise of the image capturing apparatus 221 is equal to or lower than the acceptable value or the settable band includes no drive frequencies at which the level of the motor noise of the image capturing apparatus 221 is equal to or lower than the acceptable value, the information generation section 262 determines that the drive frequency need not be changed; the processing from step S112 to step S114 is skipped, and the processing proceeds to step S115.

In step S115, the image capturing control section 261 determines whether or not to change the imager mode, on the basis of the input signal from the input section 52, the operation sequence of the image capturing apparatus 221, and the like. In a case where the imager mode is determined not to be changed, the processing proceeds to step S116.

In step S116, as is the case with the processing in step S8 in FIG. 4, whether or not the lens apparatus 222 has been removed is determined. In a case where the lens apparatus 222 is determined not to have been removed, the processing returns to step S115.

Subsequently, in step S115, the processing in step S115 and step S116 is repeatedly executed until the imager mode is determined to be changed in step S115 or the lens apparatus 222 is determined to have been removed in step S116.

On the other hand, in step S115, in a case where the imager mode is determined to be changed, the processing proceeds to step S117.

In step S117, the image capturing apparatus 221 changes the imager mode. Specifically, the image capturing control section 261 feeds the image capturing element 251 with information instructing the image capturing element 251 to change the imager mode. The image capturing element 251 changes the imager mode to the one indicated by the image capturing control section 261 and feeds the control section 301 with imager mode change information indicating the imager mode resulting from the change.

Subsequently, the processing returns to step S110 to execute step S110 and the subsequent processing.

Further, in step S116, in a case where the lens apparatus 222 is determined to have been removed, the processing proceeds to step S118.

In step S118, the information generation section 262 deletes the communication command correspondence list, the reference drive frequency information, and the drive frequency information of the lens apparatus 222. Specifically, the information generation section 262 deletes the communication command correspondence list and the reference drive frequency information of the lens apparatus 222 stored in the nonvolatile memory 271. Further, the information generation section 262 deletes the drive frequency information of the lens apparatus 222 stored in the volatile memory 272.

Subsequently, the processing returns to step S102 to execute step S102 and the subsequent processing.

<Drive Frequency Setting Processing>

Now, with reference to a flowchart in FIG. 11, drive frequency setting processing that is executed by the lens apparatus 222 in association with the drive frequency notification processing of the image capturing apparatus 221 in FIG. 9 and FIG. 10 will be described.

Note that this processing is, for example, started when the lens apparatus 222 is mounted on the image capturing apparatus 221 and ended when the lens apparatus 222 is removed from the image capturing apparatus 221. Further, before the lens apparatus 222 is mounted on the image capturing apparatus 221, the AF control section 131, the diaphragm control section 132, the camera shake correction control section 133, and the zoom control section 134 set the drive frequencies for the actuator 104*a*, the actuator 104*b*, the actuator 104*c*, and the actuator 104*d* to the respective reference drive frequencies.

In step S151, the communication control section 122 determines whether or not the communication command correspondence list has been received. The determination processing is repeatedly executed until the communication command correspondence list is determined to have been received. Then, in a case where the communication control section 122 receives, via the communication section 121, the communication command correspondence list of the image capturing apparatus 221 transmitted by the image capturing apparatus 221 in step S104 in FIG. 9 described above, the processing proceeds to step S152.

In step S152, the lens apparatus 222 transmits the communication command correspondence list. Specifically, the communication control section 122 feeds the control section 301 with the communication command correspondence list received from the image capturing apparatus 221. The information generation section 331 reads out the communication command correspondence list of the lens apparatus 222 stored in the nonvolatile memory 351 and feeds the communication command correspondence list to the communication control section 122. The communication control section 122 transmits the communication command correspondence list of the lens apparatus 222 to the image capturing apparatus 221 via the communication section 121.

In step S153, the lens apparatus 222 transmits the reference drive frequency information. Specifically, the information generation section 331 reads out the reference drive frequency information of the lens apparatus 222 stored in the nonvolatile memory 351 and feeds the reference drive frequency information to the communication control section 122. The communication control section 122 transmits the reference drive frequency information of the lens apparatus 222 to the image capturing apparatus 221 via the communication section 121.

In step S154, the lens apparatus 222 stores the communication command correspondence list of the image capturing apparatus 221. Specifically, the information generation section 331 causes the communication command correspondence list received from the image capturing apparatus 221 to be stored in the volatile memory 352. The communication command correspondence list is deleted, for example, when the lens apparatus 222 is removed from the image capturing apparatus 221.

In step S155, the information generation section 331 determines whether or not a change in drive frequency can be supported. In a case where both communication command correspondence lists of the image capturing apparatus 221 and the lens apparatus 222 include the drive frequency switching communication command, the information generation section 331 determines that a change in drive frequency can be supported, and the processing proceeds to step S156.

In step S156, the communication control section 122 determines whether or not the drive frequency switching communication command has been received. The determination processing is repeatedly executed until the drive frequency switching communication command is determined to have been received. Then, after the lens apparatus 222 is mounted on the image capturing apparatus 221 but before the drive frequency switching communication command is received, the actuators 104 are driven at the respective reference drive frequencies. On the other hand, in a case where the communication control section 122 receives, via the communication section 121, the drive frequency switching communication command transmitted by the image capturing apparatus 221 in step S112 in FIG. 10 described above, the processing proceeds to step S157.

In step S157, the lens apparatus 222 sets the drive frequencies on the basis of the drive frequency information.

Specifically, the communication control section 122 feeds the drive frequency switching communication command to the control section 301. The AF control section 131, the diaphragm control section 132, the camera shake correction control section 133, and the zoom control section 134 each set the drive frequencies for the actuator 104a, the actuator 104b, the actuator 104c, and the actuator 104d on the basis of the drive frequencies included in the drive frequency information in the drive frequency switching communication command.

Figure 5:
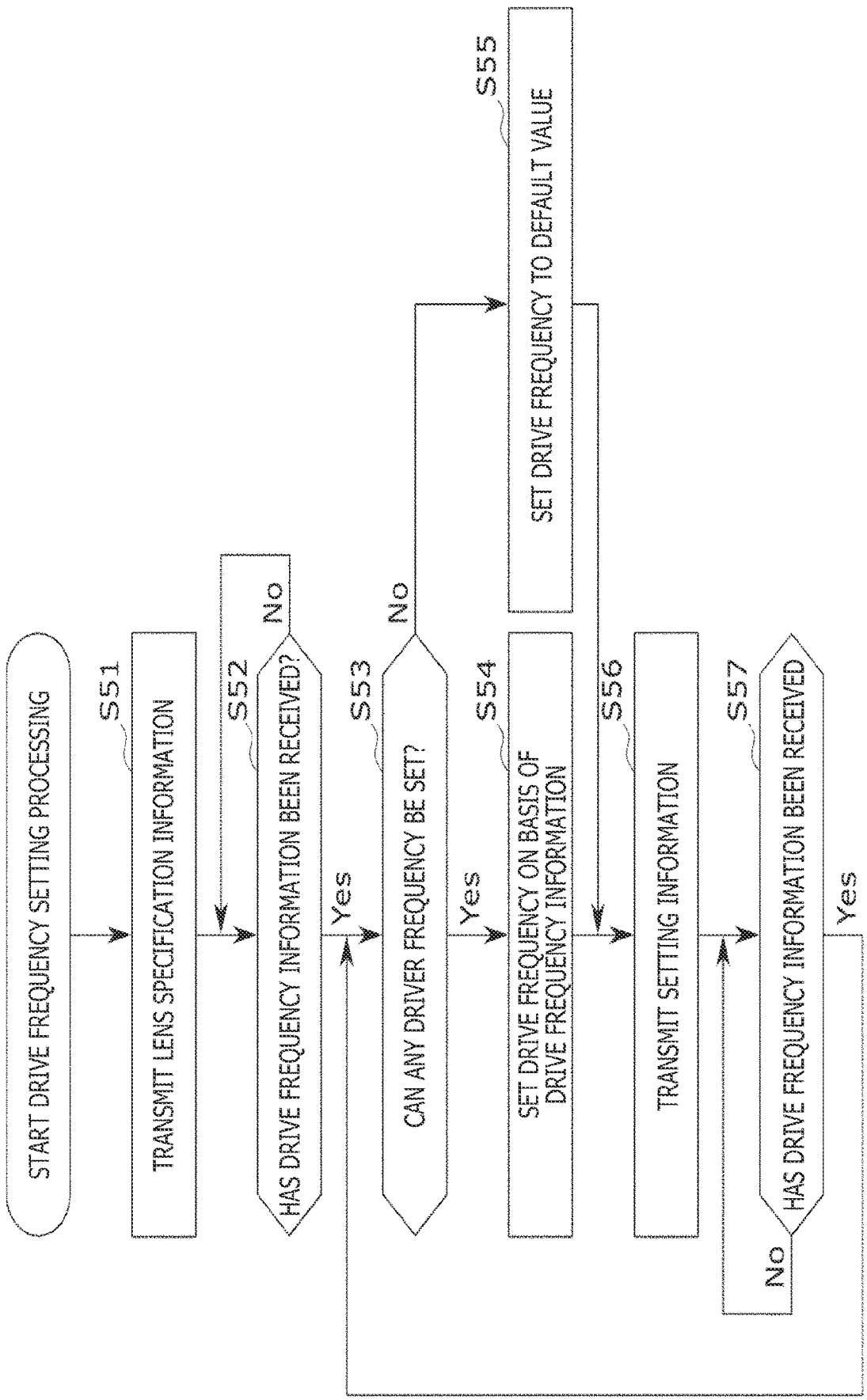
FIG. 5 is a flowchart illustrating drive frequency setting processing executed by the lens apparatus in FIG. 3.

In step S158, as is the case with the processing in step S56 in FIG. 5, the setting information is transmitted.

Subsequently, the processing returns to step S155 to execute step S155 and the subsequent processing.

On the other hand, in step S155, in a case where at least one of the communication command correspondence lists of the image capturing apparatus 221 and the lens apparatus 222 does not include the drive frequency switching communication command, the information generation section 331 determines that a change in drive frequency cannot be supported, and the drive frequency setting processing is ended. In this case, the actuators 104 of the lens apparatus 222 are driven at the respective reference drive frequencies.

Now, with reference to FIGS. 12 to 15, a specific example of the drive frequency change processing described with reference to FIGS. 9 to 11 will be described.

Note that, in the following description, for simplification of description, the drive frequencies for the actuators 104a to 104d of the lens apparatus 222 are assumed to be all set to the same frequency.

Figure 12:
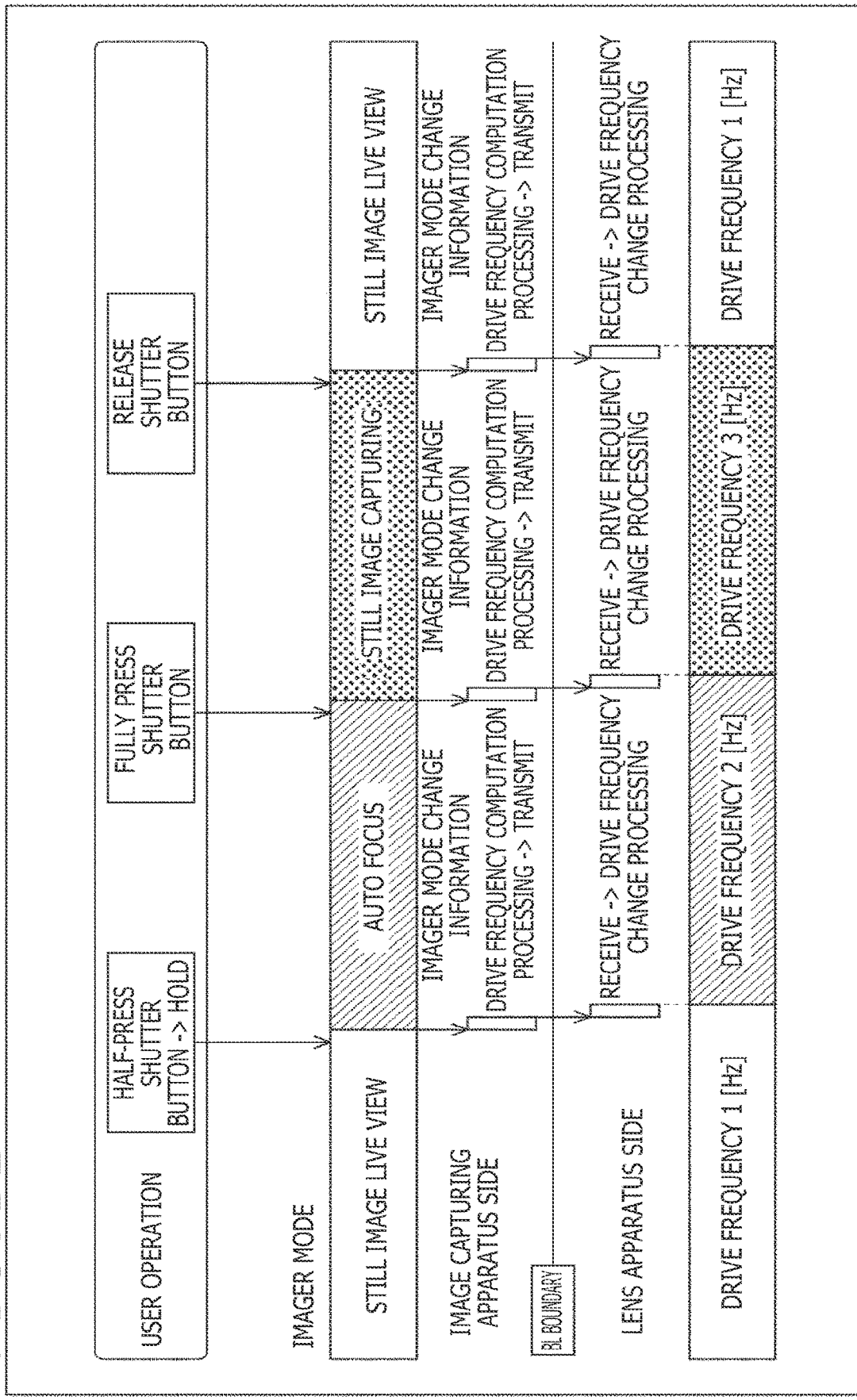
FIG. 12 is a sequence diagram illustrating a first specific example of drive frequency change processing executed by the lens apparatus.

FIG. 12 is a sequence diagram illustrating a first example of drive frequency change processing in a case where a still image is captured using the image capturing apparatus 221.

First, in an initial state, the image capturing apparatus 221 is assumed to be providing a live view of still images, and the imager mode is assumed to be set to a mode corresponding to the still image live view. Further, the drive frequencies for the actuators 104a to 104d of the lens apparatus 222 are assumed to be set equal to a drive frequency 1.

Then, for example, a shutter button provided in the input section 52 of the image capturing apparatus 221 is held half-pressed. This causes the image capturing apparatus 221 to start auto focusing, and the image capturing control section 261 instructs the image capturing element 251 to change the imager mode to a mode corresponding to auto focusing. The image capturing element 251 changes the imager mode and then feeds the control section 252 with imager mode change information for giving notice of the change of the imager mode.

The information generation section 262 performs computation of the drive frequencies corresponding to the imager mode resulting from the change, to obtain, as a computation result, a drive frequency 2 different from the drive frequency 1. The information generation section 262 generates a drive frequency switching notification command including drive frequency information indicating the drive frequency 2 and transmits the drive frequency switching notification command to the lens apparatus 222 via the communication control section 72 and the communication section 71.

The control section 301 of the lens apparatus 222 receives the drive frequency switching notification command via the communication section 121 and the communication control section 122. The AF control section 131, the diaphragm control section 132, the camera shake correction control section 133, and the zoom control section 134 respectively change the drive frequencies for the actuators 104a to 104d from the drive frequency 1 to the drive frequency 2 on the basis of the drive frequency information included in the drive frequency switching notification command.

Then, for example, the shutter button provided in the input section 52 of the image capturing apparatus 221 is fully pressed. Thus, the image capturing apparatus 221 starts capturing a still image, and the image capturing control section 261 instructs the image capturing element 251 to change the imager mode to a mode corresponding to still image capturing. The image capturing element 251 changes the imager mode and then feeds imager mode change information to the control section 252.

The information generation section 262 performs computation of the drive frequencies corresponding to the imager mode resulting from the change, to obtain, as a computation result, a drive frequency 3 different from the drive frequency 2. The information generation section 262 generates a drive frequency switching notification command including drive frequency information indicating the drive frequency 3 and transmits the drive frequency switching notification command to the lens apparatus 222 via the communication control section 72 and the communication section 71.

The control section 301 of the lens apparatus 222 receives the drive frequency switching notification command via the communication section 121 and the communication control section 122. The AF control section 131, the diaphragm control section 132, the camera shake correction control section 133, and the zoom control section 134 respectively change the drive frequencies for the actuators 104a to 104d from the drive frequency 2 to the drive frequency 3 on the basis of the drive frequency information included in the drive frequency switching notification command.

Then, for example, the shutter button provided in the input section 52 of the image capturing apparatus 221 is released. Thus, the image capturing apparatus 221 stops still image capturing and resumes live view of still images. The image capturing control section 261 instructs the image capturing element 251 to change the imager mode to a mode corresponding to the still image live view. The image capturing element 251 changes the imager mode and then feeds the imager mode change information to the control section 252.

The information generation section 262 performs computation of the drive frequencies corresponding to the imager mode resulting from the change, to obtain, as a computation result, the drive frequency 1 different from the drive frequency 3. The information generation section 262 generates a drive frequency switching notification command including drive frequency information indicating the drive frequency 1 and transmits the drive frequency switching notification command to the lens apparatus 222 via the communication control section 72 and the communication section 71.

The control section 301 of the lens apparatus 222 receives the drive frequency switching notification command via the communication section 121 and the communication control section 122. The AF control section 131, the diaphragm control section 132, the camera shake correction control section 133, and the zoom control section 134 respectively change the drive frequencies for the actuators 104a to 104d from the drive frequency 3 to the drive frequency 1 on the basis of the drive frequency information included in the drive frequency switching notification command.

Figure 13:
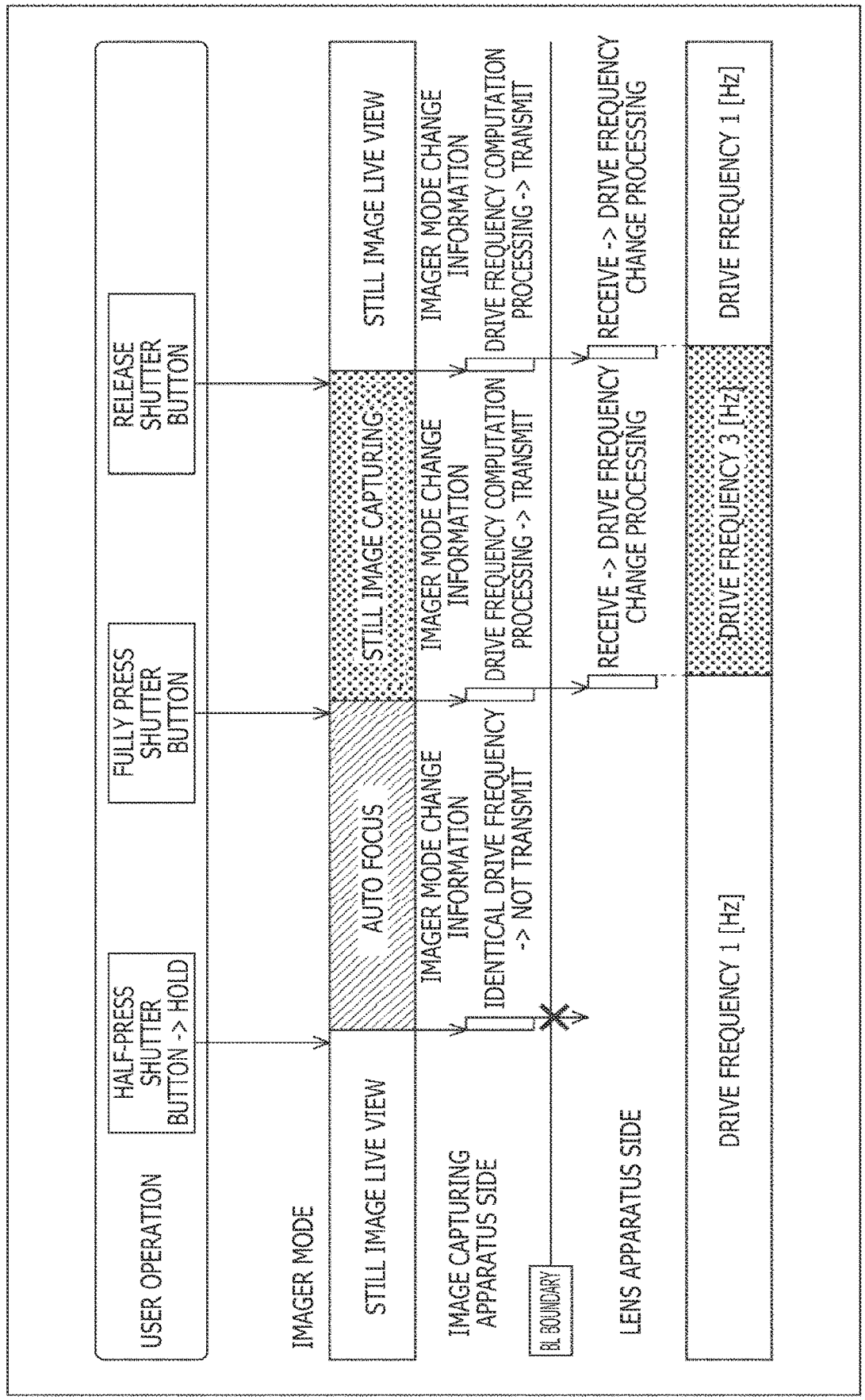
FIG. 13 is a sequence diagram illustrating a second specific example of the drive frequency change processing executed by the lens apparatus.

FIG. 13 is a sequence diagram illustrating a second example of drive frequency change processing in a case where a still image is captured using the image capturing apparatus 221.

The example in FIG. 13 differs from the example in FIG. 12 in processing executed in a case where the imager mode transitions from the mode corresponding to the still image live view to the mode corresponding to auto focusing but is similar to the example in FIG. 12 in the remaining part of the processing.

Specifically, for example, the shutter button provided in the input section 52 of the image capturing apparatus 221 is held half-pressed. This causes the image capturing apparatus 221 to start auto focusing, and the image capturing control section 261 instructs the image capturing element 251 to change the imager mode to a mode corresponding to auto focusing. The image capturing element 251 changes the imager mode and then feeds the imager mode change information to the control section 252.

The information generation section 262 performs computation of the drive frequencies corresponding to the imager mode resulting from the change, to obtain, as a computation result, the drive frequency 1 which is the same as the current drive frequency. In this case, the drive frequency for the lens apparatus 222 need not be changed, and thus, no drive frequency switching notification command is transmitted from the image capturing apparatus 221 to the lens apparatus 222.

This prevents the use of a wasteful communication band at a BL boundary between the image capturing apparatus 221 and the lens apparatus 222. Further, loads on the lens apparatus 222 are reduced.

Figure 14:
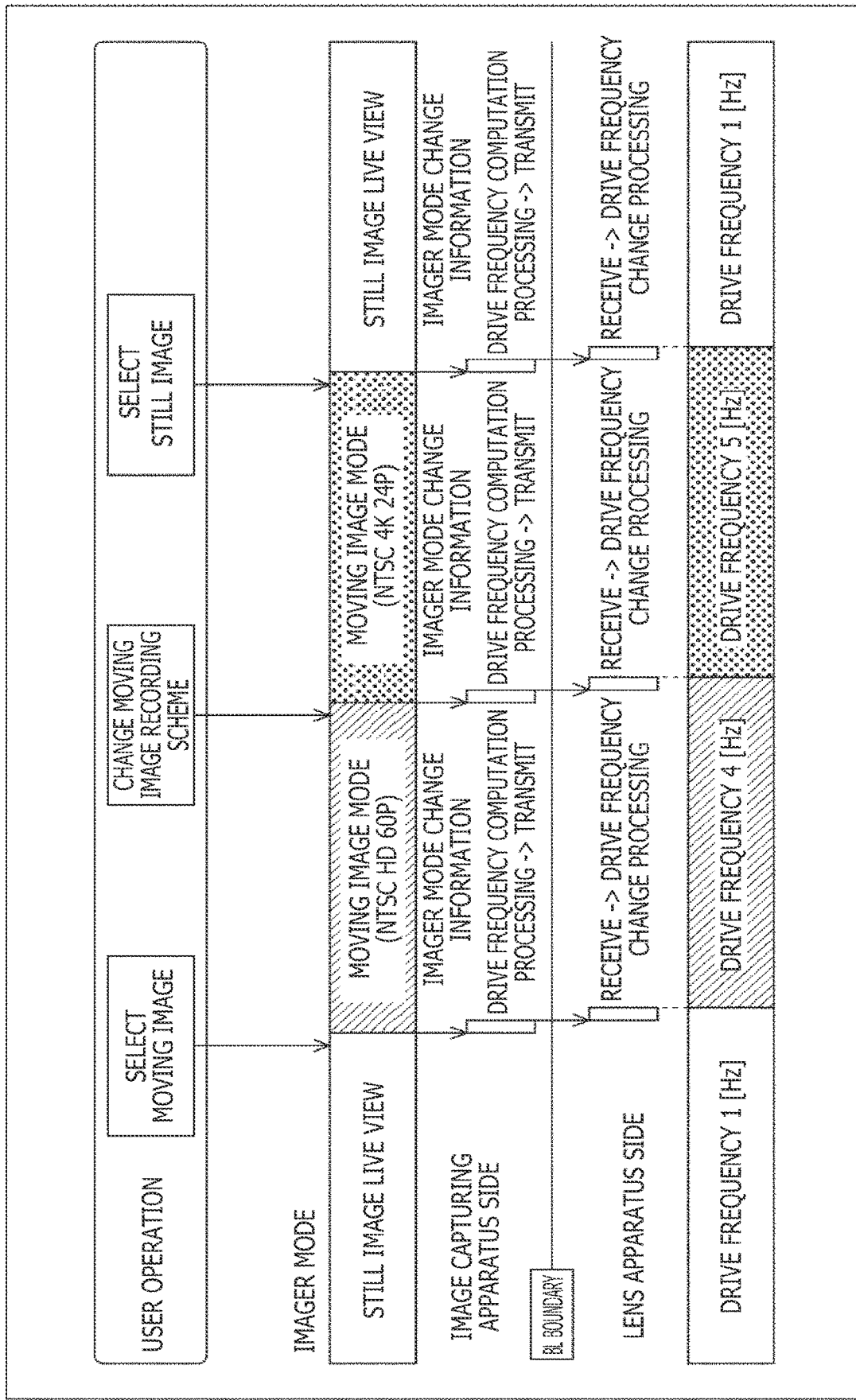
FIG. 14 is a sequence diagram illustrating a third specific example of the drive frequency change processing executed by the lens apparatus.

FIG. 14 is a sequence diagram illustrating a first example of drive frequency change processing in a case where a moving image is captured by the image capturing apparatus 221.

First, in the initial state, the image capturing apparatus 221 is assumed to be providing a live view of still images, and the imager mode is assumed to be set to the mode corresponding to the still image live view. Further, the drive frequencies for the actuators 104a to 104d of the lens apparatus 222 are assumed to be set equal to the drive frequency 1.

Then, for example, a moving image is selected from items on a dial provided in the input section 52 of the image capturing apparatus 221. Accordingly, the image capturing apparatus 221 starts HD (High Definition video) moving image capturing at 60P in accordance with NTSC (National Television System Committee), and the image capturing control section 261 instructs the image capturing element 251 to change the imager mode to a mode corresponding to a moving image mode (NTSC, HD, 60P). The image capturing element 251 changes the imager mode and then feeds the imager mode change information to the control section 252.

The information generation section 262 performs computation of the drive frequencies corresponding to the imager mode resulting from the change, to obtain, as a computation result, a drive frequency 4 different from the drive frequency 1. The information generation section 262 generates a drive frequency switching notification command including drive frequency information indicating the drive frequency 4 and transmits the drive frequency switching notification command to the lens apparatus 222 via the communication control section 72 and the communication section 71.

The control section 301 of the lens apparatus 222 receives the drive frequency switching notification command via the communication section 121 and the communication control section 122. The AF control section 131, the diaphragm control section 132, the camera shake correction control section 133, and the zoom control section 134 respectively change the drive frequencies for the actuators 104a to 104d from the drive frequency 1 to the drive frequency 4 on the basis of the drive frequency information included in the drive frequency switching notification command.

Then, for example, the input section 52 of the image capturing element 251 is operated to change a moving image recording scheme to NTSC, 4K, 24P. Accordingly, the image capturing apparatus 221 changes the moving image recording scheme, and the image capturing control section 261 instructs the image capturing element 251 to change the imager mode to a mode corresponding to a moving image mode (NTSC, 4K, 24P). The image capturing element 251 changes the imager mode and then feeds the imager mode change information to the control section 252.

The information generation section 262 performs computation of the drive frequencies corresponding to the imager mode resulting from the change, to obtain, as a computation result, a drive frequency 5 different from the drive frequency 4. The information generation section 262 generates a drive frequency switching notification command including drive frequency information indicating the drive frequency 5, and transmits the drive frequency switching notification command to the lens apparatus 222 via the communication control section 72 and the communication section 71.

The control section 301 of the lens apparatus 222 receives the drive frequency switching notification command via the communication section 121 and the communication control section 122. The AF control section 131, the diaphragm control section 132, the camera shake correction control section 133, and the zoom control section 134 respectively change the drive frequencies for the actuators 104a to 104d from the drive frequency 4 to the drive frequency 5 on the basis of the drive frequency information included in the drive frequency switching communication command.

Then, for example, a still image is selected from among the items on the dial provided in the input section 52 of the image capturing apparatus 221. Thus, the image capturing apparatus 221 stops moving image capturing and resumes live view of still images. The image capturing control section 261 instructs the image capturing element 251 to change the imager mode to the mode corresponding to the still image live view. The image capturing element 251 changes the imager mode and then feeds the imager mode change information to the control section 252.

The information generation section 262 performs computation of the drive frequencies corresponding to the imager mode resulting from the change, to obtain, as a computation result, the drive frequency 1 different from the drive frequency 5. The information generation section 262 generates a drive frequency switching notification command including drive frequency information indicating the drive frequency 1, and transmits the drive frequency switching notification command to the lens apparatus 222 via the communication control section 72 and the communication section 71.

The control section 301 of the lens apparatus 222 receives the drive frequency switching notification command via the communication section 121 and the communication control section 122. The AF control section 131, the diaphragm control section 132, the camera shake correction control section 133, and the zoom control section 134 respectively change the drive frequencies for the actuators 104a to 104d from the drive frequency 5 to the drive frequency 1 on the basis of the drive frequency information included in the drive frequency switching notification command.

Figure 15:
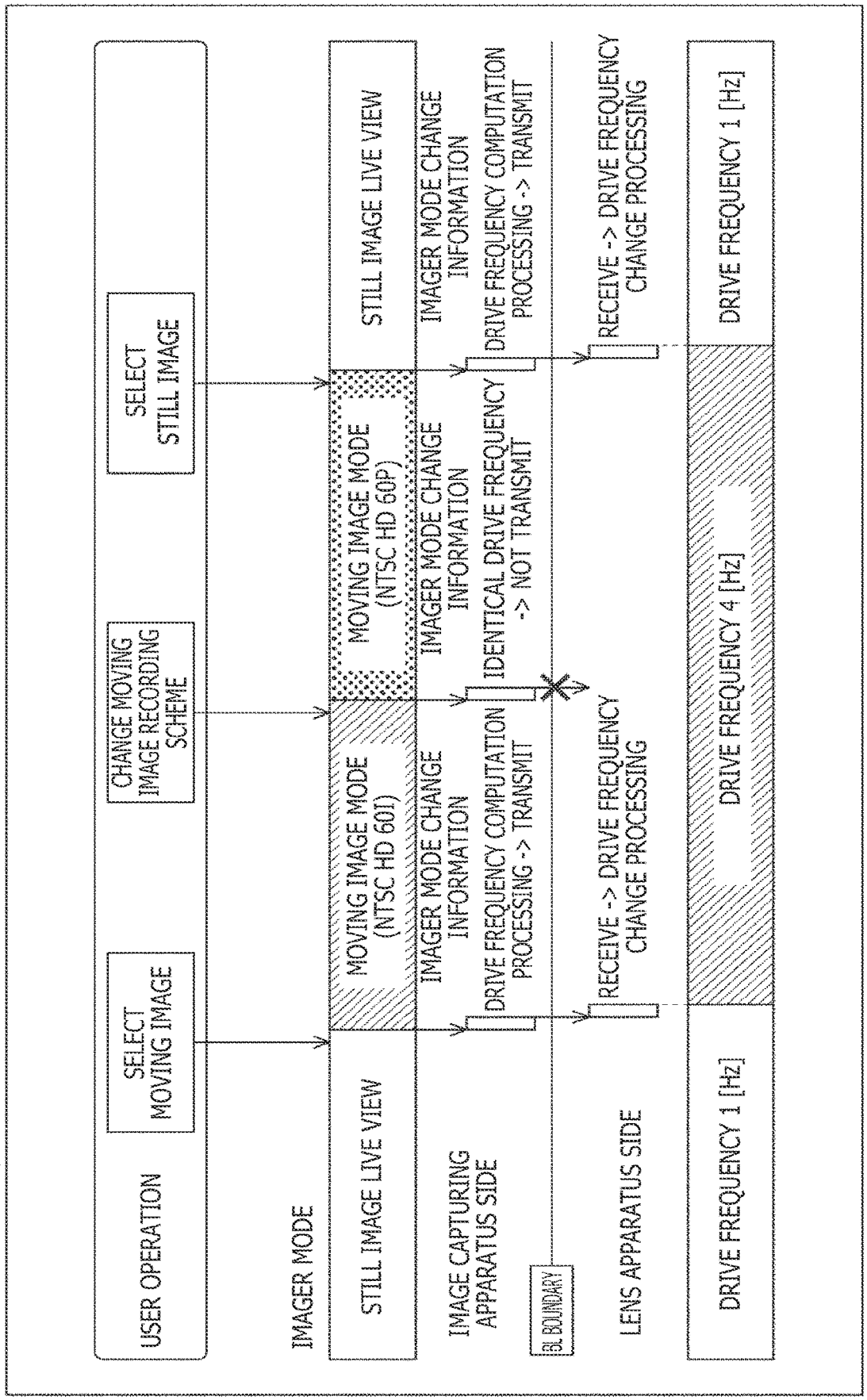
FIG. 15 is a sequence diagram illustrating a fourth specific example of the drive frequency change processing executed by the lens apparatus.

FIG. 15 is a sequence diagram illustrating a second example of drive frequency change processing in a case where a moving image is captured using the image capturing apparatus 221.

The example in FIG. 15 differs from the example in FIG. 14 in that a moving image recording scheme is changed from NTSC HD at 60I to NTSC HD at 60P but is similar to the example in FIG. 14 in the remaining part of the processing.

Specifically, for example, while a moving image of NTSC HD at 60I is being captured, the input section 52 of the image capturing apparatus 221 is operated to change the moving image recording scheme to NTSC HD at 60P. Thus, the image capturing apparatus 221 starts capturing a moving image of NTSC HD at 60P, and the image capturing control section 261 instructs the image capturing element 251 to change the imager mode to the mode corresponding to the moving image mode (NTSC, HD, 60P). The image capturing element 251 changes the imager mode and then feeds the imager mode change information to the control section 252.

The information generation section 262 performs computation of the drive frequencies corresponding to the imager mode resulting from the change, to obtain, as a computation result, the drive frequency 4 which is the same as the current drive frequency. In this case, the drive frequency for the lens apparatus 222 need not be changed, and thus, no drive frequency switching notification command is transmitted from the image capturing apparatus 221 to the lens apparatus 222.

This prevents the use of a wasteful communication band at the BL boundary between the image capturing apparatus 221 and the lens apparatus 222. Further, loads on the lens apparatus 222 are reduced.

As described above, as is the case with the first embodiment, the drive frequencies for the actuators 104 are appropriately set to make the level of the motor noise equal to or lower than the acceptable value.

Further, since the image capturing apparatus 221 computes the drive frequencies, the loads on the lens apparatus 222 can be reduced, enabling a reduction in the size and weight of the lens apparatus 222.

Furthermore, as described above, the use of a wasteful communication band is prevented at the BL boundary between the image capturing apparatus 221 and the lens apparatus 222.

3. Modified Example

A modified example of the embodiment of the present technique described above will be described below.

For example, the lens specification information transmitted to the image capturing apparatus 21 by the lens apparatus 22 may include the magnetic force of the lens apparatus 222. Then, the image capturing apparatus 21 may generate drive frequency information including recommended drive frequencies corresponding to the magnetic force of the lens apparatus 22 and transmit the drive frequency information to the lens apparatus 222.

Further, for example, the image capturing apparatus 21 may detect the magnetic force of the lens apparatus 22 to generate drive frequency information including the recommended drive frequencies corresponding to the detected magnetic force, and transmit the drive frequency information to the lens apparatus 22.

Further, for example, the magnetic force of the lens apparatus 222 may cause the voltage of the power supply for the image capturing apparatus 21 to fluctuate, leading to noise in the image. Thus, drive frequencies at which, in addition to the above-described motor noise, power supply noise can be suppressed may be set as recommended drive frequencies.

Further, the above-described configurations of the image capturing apparatus 21 and the lens apparatus 22 are illustrative and can freely be changed. For example, the number and types of the actuators 104 of the lens apparatus 222 can be changed.

Similarly, the above-described configurations of the image capturing apparatus 221 and the lens apparatus 222 are illustrative and can freely be changed. For example, the number and types of the actuators 104 of the lens apparatus 22 can be changed.

4. Miscellaneous

<Configuration Example of Computer>

The above-described series of steps of processing can be executed by hardware or software. In a case where the series of steps of processing is executed by software, a program included in the software is installed in a computer. Here, the computer includes a computer integrated in dedicated hardware (for example, the control section 53 of the image capturing apparatus 21 or the control section 102 of the lens apparatus 22) and, for example, a general-purpose personal computer that can execute various functions by using various programs installed in the computer.

The program to be executed by the computer can, for example, be recorded and provided in a removable recording medium (not illustrated) as a package medium or the like. Further, the program can be provided via a wired or wireless transmission medium such as a local network, the Internet, or digital satellite broadcasting.

Further, for example, the program read out from the removable recording medium or the program provided via the wired or wireless transmission medium is installed in the storage section (for example, the storage section 55 of the image capturing apparatus 21 or the storage section 106 of the lens apparatus 22). Further, for example, the program may be preinstalled in the storage section.

Note that the program to be executed by the computer may be a program executing processing chronologically along the order described herein or a program executing steps of processing in parallel or at required timings when, for example, the program is invoked.

Further, the system as used herein means a set of plural components (apparatuses, modules (parts), or the like) regardless of whether or not all the components are located in the same housing. Accordingly, the system refers to both plural apparatuses housed in separate housings but connected together via a network and one apparatus with plural modules housed in one housing.

Further, the embodiments of the present technique are not limited to the above-described embodiments, and various changes can be made to the embodiments without departing from the spirits of the present technique.

For example, the present technique can be configured as cloud computing in which one function is shared among plural apparatuses via a network and cooperatively processed by the apparatuses.

Further, the steps described in the above-described flowcharts can be executed not only by one apparatus but also by plural apparatuses in a shared manner.

Furthermore, in a case where one step includes plural sub-steps of processing, the plural sub-steps of processing included in the one step can be executed not only by one apparatus but also by plural apparatuses in a shared manner.

<Examples of Combination of Components>

The present technique can also be configured as follows.

(1)

A lens apparatus enabled to be mounted on an image capturing apparatus, the lens apparatus including:

an actuator;

a communication section configured to receive, from the image capturing apparatus, drive frequency information used to set a drive frequency for the actuator;

a control section configured to set the drive frequency for the actuator on the basis of the drive frequency information; and a driving section configured to drive the actuator at the drive frequency set.

(2)

The lens apparatus according to (1) described above, in which the drive frequency information includes the drive frequency for the actuator, and the control section sets the drive frequency for the actuator to the drive frequency included in the drive frequency information.

(3)

The lens apparatus according to (2) described above, in which, in a case of not having received the drive frequency information from the image capturing apparatus, the control section sets the drive frequency for the actuator to a default value.

(4)

The lens apparatus according to (1) described above, in which the drive frequency information includes candidates for the drive frequency for the actuator, and the control section sets one of the candidates as the drive frequency for the actuator.

(5)

The lens apparatus according to (4) described above, in which the drive frequency information includes a correspondence relation between a magnetic force of the lens apparatus and the candidates, and the control section sets one of the candidates as the drive frequency for the actuator on the basis of the magnetic force of the lens apparatus.

(6)

The lens apparatus according to (5) described above, in which the drive frequency information includes an upper limit value of the magnetic force of the lens apparatus at which value the drive frequency for the actuator need not be set in association with the image capturing apparatus, and in a case where the magnetic force of the lens apparatus is equal to or lower than the upper limit value, the control section sets the drive frequency for the actuator to a default value.

(7)

The lens apparatus according to any one of (4) to (6) described above, in which the control section sets, as the drive frequency for the actuator, one of the candidates corresponding to a drive frequency closest to the default value of the drive frequency for the actuator.

(8)

The lens apparatus according to any one of (4) to (7) described above, in which, in a case where the candidates include no drive frequency that can be set, the control section sets the drive frequency for the actuator to the default value.

(9)

The lens apparatus according to (8) described above, in which the communication section transmits, to the image capturing apparatus, information indicating that setting to any drive frequency included in the candidates is unavailable.

(10)

The lens apparatus according to any one of (1) to (9) described above, in which the communication section transmits, to the image capturing apparatus, information indicating whether or not the drive frequency for the actuator needs to be associated with the image capturing apparatus.

(11)

The lens apparatus according to any one of (1) to (10) described above, in which the communication section transmits, to the image capturing apparatus, information including the magnetic force of the lens apparatus, and receives, from the image capturing apparatus, the drive frequency information corresponding to the magnetic force of the lens apparatus.

(12)

A driving method including:

by a lens apparatus including an actuator and enabled to be mounted on an image capturing apparatus, receiving, from the image capturing apparatus, drive frequency information used to set a drive frequency for the actuator;

setting the drive frequency for the actuator on the basis of the drive frequency information; and driving the actuator at the drive frequency set.

(13)

An image capturing apparatus in which a lens apparatus is enabled to be mounted, the image capturing apparatus including:

an image capturing element, an information generation section configured to generate drive frequency information used to set a drive frequency for an actuator included in the lens apparatus, and a communication section configured to transmit the drive frequency information to the lens apparatus.

(14)

The image capturing apparatus according to (13) described above, in which the drive frequency information includes the drive frequency for the actuator.

(15)

The image capturing apparatus according to (13) described above, in which the drive frequency information includes candidates for the drive frequency for the actuator.

(16)

The image capturing apparatus according to (15) described above, in which the drive frequency information includes a correspondence relation between a magnetic force of the lens apparatus and the candidates.

(17)

The image capturing apparatus according to (16) described above, in which the drive frequency information includes an upper limit value of the magnetic force of the lens apparatus at which value the drive frequency for the actuator need not be set in association with the image capturing apparatus.

(18)

The image capturing apparatus according to any one of (13) to (17) described above, in which the information generation section generates the drive frequency information corresponding to a driving mode for the image capturing element.

(19)

The image capturing apparatus according to (18) described above, in which, when the driving mode for the image capturing element is changed, the communication section transmits the drive frequency information to the lens apparatus.

(20)

The image capturing apparatus according to any one of (13) to (19) described above, in which, when the lens apparatus is mounted, the communication section transmits the drive frequency information to the lens apparatus.

(21)

The image capturing apparatus according to any one of (13) to (20) described above, in which, in a case where the drive frequency for the actuator needs to be changed, the communication section transmits the drive frequency information to the lens apparatus.

(22)

The image capturing apparatus according to (13) described above, in which the communication section receives, from the lens apparatus, information indicating whether or not the drive frequency for the actuator needs to be associated with the image capturing apparatus, and in a case where the drive frequency for the actuator needs to be associated with the image capturing apparatus, the communication section transmits the drive frequency information to the lens apparatus.

(23)

The image capturing apparatus according to any one of (13) to (20) described above, in which the communication section receives, from the lens apparatus, information including the magnetic force of the lens apparatus, and the information generation section generates the drive frequency information corresponding to the magnetic force of the lens apparatus.

(24)

An image capturing system including:

an image capturing apparatus; and a lens apparatus mounted on the image capturing apparatus, in which the image capturing apparatus includes an information generation section configured to generate drive frequency information used to set a drive frequency for an actuator included in the lens apparatus, and a first communication section configured to transmit the drive frequency information to the lens apparatus, and the lens apparatus includes the actuator, a second communication section configured to receive the drive frequency information from the image capturing apparatus, a control section configured to set the drive frequency for the actuator on the basis of the drive frequency information, and a driving section configured to drive the actuator at the drive frequency set.

Note that the effects described herein are only illustrative and not limitative and that any other effects may be produced.

REFERENCE SIGNS LIST

11 Image capturing system, 21 Image capturing apparatus, 22 Lens apparatus, 51 Image capturing element, 53 Control section, 54 Communication processing section, 61 Image capturing control section, 63 Information generation section, 64 Lens detection section, 71 Communication section, 72 Communication control section, 101 Communication processing section, 102 Control section, 103 Driving section, 104a to 104d Actuator, 105 Mechanical section, 121 Communication section, 122 Communication control section, 131 AF control section, 132 Diaphragm control section, 133 Camera shake correction control section, 134 Zoom control section, 135 Information generation section, 141 AF mechanism, 142 Diaphragm mechanism, 143 Camera shake correction mechanism, 144 Zoom mechanism, 201 Image capturing system, 221 Image capturing apparatus, 222 Lens apparatus, 251 Image capturing element, 252 Control section, 262 Information generation section, 301 Control section, 331 Information generation section

The invention claimed is:

1. A lens apparatus enabled to be mounted on an image capturing apparatus, the lens apparatus comprising:

an actuator;

a communication section configured to receive, from the image capturing apparatus, drive frequency information used to set a drive frequency for the actuator, wherein the drive frequency information includes:

a plurality of candidates for the drive frequency for the actuator, and a correspondence relation between a magnetic force of the lens apparatus and the plurality of candidates;

a control section configured to set a first candidate of the plurality of candidates as the drive frequency for the actuator based on the magnetic force of the lens apparatus; and a driving section configured to drive the actuator at the set drive frequency.

2. The lens apparatus according to claim 1, wherein the control section is further configured to set the drive frequency for the actuator to the drive frequency included in the drive frequency information.

3. The lens apparatus according to claim 1, wherein, based on absence of the drive frequency information from the image capturing apparatus, the control section is further configured to set the drive frequency for the actuator to a default value.

4. The lens apparatus according to claim 1, wherein the drive frequency information further includes an upper limit value of the magnetic force of the lens apparatus at which value the drive frequency for the actuator need not be set in association with the image capturing apparatus, and the control section is further configured to set, when the magnetic force of the lens apparatus is equal to or lower than the upper limit value, the drive frequency for the actuator to a default value.

5. The lens apparatus according to claim 1, wherein
the control section is further configured to set, as the drive frequency for the actuator, a second candidate of the plurality of candidates, and
the second candidate corresponds to a drive frequency closest to a default value of the drive frequency for the actuator.

6. The lens apparatus according to claim 1, wherein, when the plurality of candidates includes no drive frequency that can be set, the control section is further configured to set the drive frequency for the actuator to a default value.

7. The lens apparatus according to claim 6, wherein the communication section is further configured to transmit, to the image capturing apparatus, information indicating that setting to any drive frequency included in the plurality of candidates is unavailable.

8. The lens apparatus according to claim 1, wherein the communication section is further configured to transmit, to the image capturing apparatus, information indicating whether the drive frequency for the actuator needs to be associated with the image capturing apparatus.

9. The lens apparatus according to claim 1, wherein the communication section is further configured to:
transmit, to the image capturing apparatus, information including the magnetic force of the lens apparatus; and
receive, from the image capturing apparatus, the drive frequency information corresponding to the magnetic force of the lens apparatus.

10. A driving method, comprising:
by a lens apparatus including an actuator and enabled to be mounted on an image capturing apparatus,
receiving, from the image capturing apparatus, drive frequency information used to set a drive frequency for the actuator, wherein the drive frequency information includes:
a plurality of candidates for the drive frequency for the actuator, and
a correspondence relation between a magnetic force of the lens apparatus and the plurality of candidates;
setting a specific candidate of the plurality of candidates as the drive frequency for the actuator based on the magnetic force of the lens apparatus; and
driving the actuator at the set drive frequency.

11. An image capturing apparatus in which a lens apparatus is enabled to be mounted, the image capturing apparatus, comprising:
an image capturing element;
an information generation section configured to generate drive frequency information used to set a drive frequency for an actuator included in the lens apparatus, wherein the drive frequency information includes:
a plurality of candidates for the drive frequency for the actuator, and
a correspondence relation between a magnetic force of the lens apparatus and the plurality of candidates; and
a communication section configured to transmit the drive frequency information to the lens apparatus.

12. The image capturing apparatus according to claim 11, wherein the drive frequency information further includes an upper limit value of the magnetic force of the lens apparatus at which value the drive frequency for the actuator need not be set in association with the image capturing apparatus.

13. The image capturing apparatus according to claim 11, wherein the information generation section is further configured to generate the drive frequency information corresponding to a driving mode for the image capturing element.

14. The image capturing apparatus according to claim 13, wherein, when the driving mode for the image capturing element is changed, the communication section is further configured to transmit the drive frequency information to the lens apparatus.

15. The image capturing apparatus according to claim 11, wherein, when the lens apparatus is mounted, the communication section is further configured to transmit the drive frequency information to the lens apparatus.

16. The image capturing apparatus according to claim 11, wherein, when the drive frequency for the actuator needs to be changed, the communication section is further configured to transmit the drive frequency information to the lens apparatus.

17. The image capturing apparatus according to claim 11, wherein
the communication section is further configured to receive, from the lens apparatus, information indicating whether the drive frequency for the actuator needs to be associated with the image capturing apparatus, and
the communication section is further configured to transmit, when the drive frequency for the actuator needs to be associated with the image capturing apparatus, the drive frequency information to the lens apparatus.

18. The image capturing apparatus according to claim 11, wherein
the communication section is further configured to receive, from the lens apparatus, information including the magnetic force of the lens apparatus, and
the information generation section is further configured to generate the drive frequency information corresponding to the magnetic force of the lens apparatus.

19. An image capturing system, comprising:
an image capturing apparatus; and
a lens apparatus mounted on the image capturing apparatus, wherein the image capturing apparatus includes:
an information generation section configured to generate drive frequency information used to set a drive frequency for an actuator included in the lens apparatus, wherein the drive frequency information includes:
a plurality of candidates for the drive frequency for the actuator, and
a correspondence relation between a magnetic force of the lens apparatus and the plurality of candidates, and
a first communication section configured to transmit the drive frequency information to the lens apparatus, and
the lens apparatus includes:
the actuator,
a second communication section configured to receive the drive frequency information from the image capturing apparatus,
a control section configured to set a specific candidate of the plurality of candidates as the drive frequency for the actuator based on the magnetic force of the lens apparatus, and
a driving section configured to drive the actuator at the set drive frequency.

* * * * *